United States Patent [19]

Okayama

[11] Patent Number: 6,097,517
[45] Date of Patent: Aug. 1, 2000

[54] WAVELENGTH ROUTER

[75] Inventor: Hideaki Okayama, Tokyo, Japan

[73] Assignee: Oki Electric Industry Co., Ltd., Tokyo, Japan

[21] Appl. No.: 08/706,323

[22] Filed: Aug. 30, 1996

[30]     Foreign Application Priority Data

| Sep. 1, 1995 | [JP] | Japan | ................................... | 7-225142 |
| Nov. 15, 1995 | [JP] | Japan | ................................... | 7-297000 |
| Jan. 9, 1996 | [JP] | Japan | ................................... | 8-001211 |

[51] Int. Cl.[7] .................................................. H04J 14/02
[52] U.S. Cl. ........................................... 359/124; 359/128
[58] Field of Search ................................... 359/124, 109, 359/128, 117, 139; 385/24

[56]              References Cited

PUBLICATIONS

Masafumi Koga et al, "Optical Path Cross–Connect System—Transport Experiment in Simulating 5–Node Network", Procedings of the 1995 Communications Society Conference of The Institute of Electronics, Information and Communication Engineers of Japan, 1995, pp. 474–475.

Jacob Sharony et al, "The Wavelength Dilation Concept in Lightwave Networks—Implementation and System Considerations", Journal of Lightwave Technology, IEEE, vol. 11, No. 5/6, May/Jun. 1993, pp. 900–907.

Y.D. Jin et al, "Performance Degradation Due to Cross–talk in Multiwavelength Optical Networks Using Dynamic Wavelength Routing", IEEE Photonics Technology Letters, vol. 7, No. 10, Oct. 1995, pp. 1210–1212.

*Primary Examiner*—Kinfe-Michael Negash
*Attorney, Agent, or Firm*—Venable; Robert J. Frank; Michael A. Sartori

[57]              ABSTRACT

A wavelength router has first ports each receiving or providing a first multiwavelength optical signal having wavelengths, and second ports each providing or receiving second multiwavelength optical signals having multiplexed wavelengths. The number of multiplexed wavelengths of the second multiwavelength optical signal is smaller than the number of wavelengths of the first multiwavelength optical signal. The first multiwavelength optical signal is demultiplexed into the second multiwavelength optical signal. The second multiwavelength optical signals are multiplexed into the first multiwavelength optical signal. The first multiwavelength optical signal has a number N of multiplexed wavelengths, and the second ports are divided into M sets of second ports. The first multiwavelength optical signal is demultiplexed into optical signals having a number N/M of multiplexed wavelengths, which are supplied to the M sets of second ports.

3 Claims, 23 Drawing Sheets

Fig. 2

| | | PORT a | | | | | | | |
|---|---|---|---|---|---|---|---|---|---|
| 15 | | 1 | 2 | 3 | 4 | 5 | 6 | 7 | 8 | 9 |
| | 1 | λ0 | λ1 | λ2 | λ3 | λ4 | λ5 | λ6 | λ7 | λ8 |
| | 2 | λ1 | λ2 | λ3 | λ4 | λ5 | λ6 | λ7 | λ8 | λ0 |
| | 3 | λ2 | λ3 | λ4 | λ5 | λ6 | λ7 | λ8 | λ0 | λ1 |
| PORT b | 4 | λ3 | λ4 | λ5 | λ6 | λ7 | λ8 | λ0 | λ1 | λ2 |
| | 5 | λ4 | λ5 | λ6 | λ7 | λ8 | λ0 | λ1 | λ2 | λ3 |
| | 6 | λ5 | λ6 | λ7 | λ8 | λ0 | λ1 | λ2 | λ3 | λ4 |
| | 7 | λ6 | λ7 | λ8 | λ0 | λ1 | λ2 | λ3 | λ4 | λ5 |
| | 8 | λ7 | λ8 | λ0 | λ1 | λ2 | λ3 | λ4 | λ5 | λ6 |
| | 9 | λ8 | λ0 | λ1 | λ2 | λ3 | λ4 | λ5 | λ6 | λ7 |

PORT a

| | 1 | 2 | 3 | 4 | 5 | 6 | 7 | 8 | 9 |
|---|---|---|---|---|---|---|---|---|---|
| 1 | $\lambda 0$ | $\lambda 1$ | $\lambda 2$ | $\lambda 0$ | $\lambda 1$ | $\lambda 2$ | $\lambda 0$ | $\lambda 1$ | $\lambda 2$ |
| 2 | $\lambda 1$ | $\lambda 2$ | $\lambda 0$ | $\lambda 1$ | $\lambda 2$ | $\lambda 0$ | $\lambda 1$ | $\lambda 2$ | $\lambda 0$ |
| 3 | $\lambda 2$ | $\lambda 0$ | $\lambda 1$ | $\lambda 2$ | $\lambda 0$ | $\lambda 1$ | $\lambda 2$ | $\lambda 0$ | $\lambda 1$ |
| 4 | $\lambda 0$ | $\lambda 1$ | $\lambda 2$ | $\lambda 0$ | $\lambda 1$ | $\lambda 2$ | $\lambda 0$ | $\lambda 1$ | $\lambda 2$ |
| 5 | $\lambda 1$ | $\lambda 2$ | $\lambda 0$ | $\lambda 1$ | $\lambda 2$ | $\lambda 0$ | $\lambda 1$ | $\lambda 2$ | $\lambda 0$ |
| 6 | $\lambda 2$ | $\lambda 0$ | $\lambda 1$ | $\lambda 2$ | $\lambda 0$ | $\lambda 1$ | $\lambda 2$ | $\lambda 0$ | $\lambda 1$ |
| 7 | $\lambda 0$ | $\lambda 1$ | $\lambda 2$ | $\lambda 0$ | $\lambda 1$ | $\lambda 2$ | $\lambda 0$ | $\lambda 1$ | $\lambda 2$ |
| 8 | $\lambda 1$ | $\lambda 2$ | $\lambda 0$ | $\lambda 1$ | $\lambda 2$ | $\lambda 0$ | $\lambda 1$ | $\lambda 2$ | $\lambda 0$ |
| 9 | $\lambda 2$ | $\lambda 0$ | $\lambda 1$ | $\lambda 2$ | $\lambda 0$ | $\lambda 1$ | $\lambda 2$ | $\lambda 0$ | $\lambda 1$ |

PORT b (rows 1–9)

PORT a

|   | 1 | 2 | 3 | 4 | 5 | 6 | 7 | 8 | 9 |
|---|---|---|---|---|---|---|---|---|---|
| 1 | λ0 | λ1 | λ2 | λ3 | λ4 | λ5 | λ6 | λ7 | λ8 |
| 2 | λ1 | λ2 | λ3 | λ4 | λ5 | λ6 | λ7 | λ8 | λ0 |
| 3 | λ2 | λ3 | λ4 | λ5 | λ6 | λ7 | λ8 | λ0 | λ1 |
| 4 | λ3 | λ4 | λ5 | λ6 | λ7 | λ8 | λ0 | λ1 | λ2 |
| 5 | λ4 | λ5 | λ6 | λ7 | λ8 | λ0 | λ1 | λ2 | λ3 |
| 6 | λ5 | λ6 | λ7 | λ8 | λ0 | λ1 | λ2 | λ3 | λ4 |
| 7 | λ6 | λ7 | λ8 | λ0 | λ1 | λ2 | λ3 | λ4 | λ5 |
| 8 | λ7 | λ8 | λ0 | λ1 | λ2 | λ3 | λ4 | λ5 | λ6 |
| 9 | λ8 | λ0 | λ1 | λ2 | λ3 | λ4 | λ5 | λ6 | λ7 |

PORT b (rows 1–9)

PORT a

| 1 | 2 | 3 | 4 | 5 | 6 | 7 | 8 | 9 |
|---|---|---|---|---|---|---|---|---|
| 1 | λ0 | λ1 | λ2 | λ3 | λ4 | λ5 | λ6 | λ7 | λ8 |
| 2 | λ1 | λ2 | λ3 | λ4 | λ5 | λ6 | λ7 | λ8 | λ0 |
| 3 | λ2 | λ3 | λ4 | λ5 | λ6 | λ7 | λ8 | λ0 | λ1 |
| 4 | λ3 | λ4 | λ5 | λ6 | λ7 | λ8 | λ0 | λ1 | λ2 |
| 5 | λ4 | λ5 | λ6 | λ7 | λ8 | λ0 | λ1 | λ2 | λ3 |
| 6 | λ5 | λ6 | λ7 | λ8 | λ0 | λ1 | λ2 | λ3 | λ4 |
| 7 | λ6 | λ7 | λ8 | λ0 | λ1 | λ2 | λ3 | λ4 | λ5 |
| 8 | λ7 | λ8 | λ0 | λ1 | λ2 | λ3 | λ4 | λ5 | λ6 |
| 9 | λ8 | λ0 | λ1 | λ2 | λ3 | λ4 | λ5 | λ6 | λ7 |

PORT b

Fig. 25

545
PORT a

|   | 1 | 2 | 3 | 4 | 5 | 6 | 7 | 8 | 9 |
|---|---|---|---|---|---|---|---|---|---|
| 1 | λ0 | λ1 | λ2 | λ3 | λ4 | λ5 | λ6 | λ7 | λ8 |
| 2 | λ1 | λ2 | λ3 | λ4 | λ5 | λ6 | λ7 | λ8 | λ0 |
| 3 | λ2 | λ3 | λ4 | λ5 | λ6 | λ7 | λ8 | λ0 | λ1 |
| 4 | λ3 | λ4 | λ5 | λ6 | λ7 | λ8 | λ0 | λ1 | λ2 |
| 5 | λ4 | λ5 | λ6 | λ7 | λ8 | λ0 | λ1 | λ2 | λ3 |
| 6 | λ5 | λ6 | λ7 | λ8 | λ0 | λ1 | λ2 | λ3 | λ4 |
| 7 | λ6 | λ7 | λ8 | λ0 | λ1 | λ2 | λ3 | λ4 | λ5 |
| 8 | λ7 | λ8 | λ0 | λ1 | λ2 | λ3 | λ4 | λ5 | λ6 |
| 9 | λ8 | λ0 | λ1 | λ2 | λ3 | λ4 | λ5 | λ6 | λ7 |

PORT b (rows 1–9)

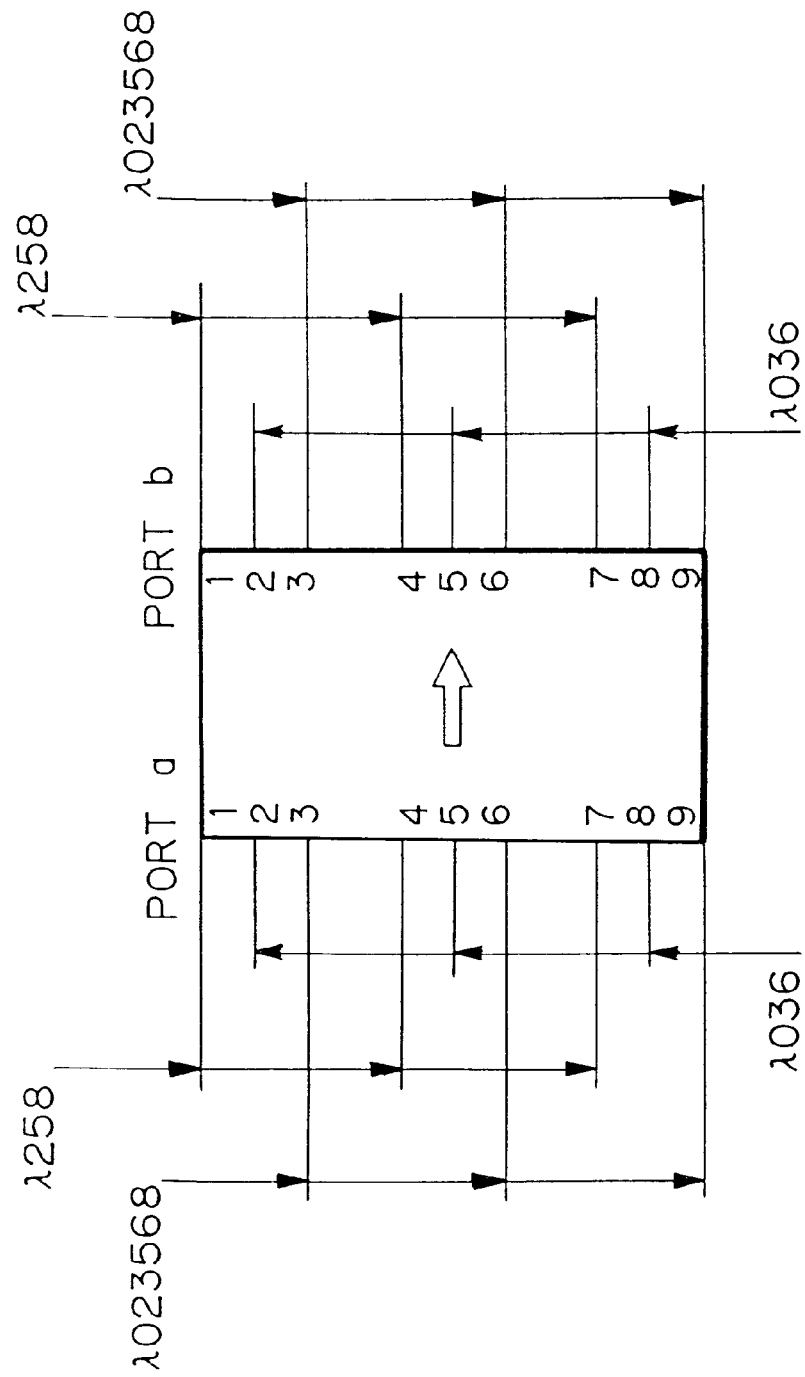

WAVELENGTH ROUTER

BACKGROUND OF THE INVENTION

1. Field of the Invention

The present invention relates to a multiwavelength optical switch connected to a plurality of multiwavelength optical circuits, such as optical fibers which transmit a multiwavelength optical signal, and for carrying out circuit switching across channels of the same wavelengths.

2. Description of the Background Art

The following conventional circuit switching systems are described in Ken-ichi Yukimatsu et al., "Introduction to Optical Switching Technique", pp. 42–43, Ohm Limited, 1993, Tokyo, one of the references on conventional multiwavelength optical signals.

A first system demultiplexes a multiwavelength optical signal into a plurality of wavelengths with wavelength channel selectors provided for individual channels, and inputs the demultiplexed signals to an optical matrix switch for the individual channels, thereby outputting the signals from desired output ports. A second system splits a multiwavelength optical signal into signals which correspond in number to the number of output ports in terms of power, and then inputs them to a multiwavelength selecting filter, thereby outputting desired wavelength signals A third system is configured by using 2×2 switches composed of acousto-optical (AO) transducers.

As another prior art, Masafumi KOGA. et al. proposed an optical path cross-connect system based on a wavelength path concept in "Optical Path Cross-Connect System", Proceedings of the 1995 Communications Society Conference of the Institute of Electronics, Information and Communication Engineers of Japan.

In addition, Jacob Sharony et al., proposed a new class of dynamic wavelength-routing cross-connects in "The Wavelength Dilation Concept in Lightwave Networks—Implementation and System Considerations", Journal of Lightwave Technology, Vol. II, No. 5/6, May/June 1993, and Y. D. Jin et al. referred to dynamic wavelength router in "Performance Degradation Due to Crosstalk in Multiwavelength Optical Networks Using Dynamic Wavelength Routing", IEEE Photonics Technology Letters, Vol. 7, No. 10, October 1995.

The first system is thought to be most easily put into practice because it has low power loss and facilitates multiport configuration. A conventional multiwavelength highway switch to which M circuits are connected, each of M circuits being an N multiwavelength circuit, where M and N are natural numbers, includes wavelength demultiplexers and wavelength multiplexers, each connected for each one of the multiwavelength circuit at the input and output sides, and matrix switches provided for respective wavelengths Such a multiwavelength highway switch has a problem in that it cannot increase its integration size. This is because a multi-input wavelength demultiplexer and multiplexer that can accommodate a number of circuits belongs to an undeveloped technique, and hence it requires 2M wavelength demultiplexers and multiplexers at input and output sides, and a tri-dimensional configuration of 2N×M lines for interconnecting the demultiplexers and multiplexers with the matrix switches

SUMMARY OF THE INVENTION

Therefore an object of the present invention is to provide a multiwavelength optical switch of simple construction which can eliminate the drawbacks of the prior art.

Another object of the present invention is to provide a multiwavelength optical switch of high integration size which facilitates assembling.

According to a first aspect of the present invention, there is provided a wavelength router for producing wavelength optical signals from output ports in accordance with wavelengths included in a multiwavelength optical signal applied to input ports, the wavelength router comprising: H input ports to which a first multiwavelength optical signal is input, where M is a natural number; n output ports from which a plurality of second multiwavelength optical signals are output, where n is a natural number greater than the M, wherein a number of multiplexed wavelengths of the second multiwavelength optical signals is smaller than that of the first multiwavelength optical signal;

and demultiplexing means for demultiplexing the first multiwavelength optical signal to the plurality of second multiwavelength optical signals, and for supplying each of the plurality of second multiwavelength optical signals to each one of the n output ports, wherein the wavelength router outputs the first multiwavelength optical signal from the M input ports when the second multiwavelength optical signals are input to the n output ports.

Here, the first multiwavelength optical signal may have a number of multiplexed wavelengths of N, the plurality of output ports may be divided into M sets of output ports, and the demultiplexing means may demultiplex the first multiwavelength optical signal to optical signals whose number of multiplexed wavelengths is N/M, and supply the optical signals to the M sets of the output ports.

According to a second aspect of the present invention, there is provided a wavelength router having n input ports and n output ports, where n is a natural number, the wavelength router producing wavelength optical signals from the output ports in accordance with wavelengths included in a multiwavelength optical signal applied to the input ports, the wavelength router comprising: M input ports out of the n input ports to which a first multiwavelength optical signal is input, where M is a natural number less than the n; n-M output ports out of the n output ports from which a plurality of second multiwavelength optical signals are output, wherein a number of multiplexed wavelengths of the second multiwavelength optical signals is smaller than that of the first multiwavelength optical signal; demultiplexing means for demultiplexing the first multiwavelength optical signal to the plurality of second multiwavelength optical signals, and for supplying each of the plurality of second multiwavelength optical signals to each one of the n-M output ports; n-M input ports other than the M input ports, to which the second multiwavelength optical signals output from the n-M output ports are input; M output ports other than the n-M output ports, from each of which a third multiwavelength optical signal is output, wherein a number of multiplexed wavelengths of the third multiwavelength optical signal is greater than that of the second multiwavelength optical signal; and multiplexing means for multiplexing the second multiwavelength optical signals into the third multiwavelength optical signal.

Here, the first and third multiwavelength optical signal may have a number of multiplexed wavelengths of N, and the demultiplexing means may demultiplex the first multiwavelength optical signal to optical signals with a number of multiplexed wavelengths being N/M.

The third multiwavelength optical signal may correspond to the first multiwavelength optical signal.

According to a third aspect of the present invention, there is provide a multiwavelength optical switch whose input ports and output ports are each connected to multiwavelength optical transmission lines, the multiwavelength optical switch comprising: demultiplexing means for demultiplexing a first multiwavelength optical signal to a plurality of second multiwavelength optical signals whose number of multiplexed wavelengths is less than that of the first multiwavelength optical signal, and for supplying each of the second multiwavelength optical signals to a plurality of output ports; multiplexing means for multiplexing the second multiwavelength optical signals to the first multiwavelength optical signal; switching means connected between the demultiplexing means and the multiplexing means for switching the second multiwavelength optical signals; and link means for connecting output ports of the demultiplexing means to input ports of the switching means, and input ports of the multiplexing means to the output ports of the switching means.

Here, the demultiplexing means may comprise a first wavelength router and the multiplexing means may comprise a second wavelength router, each of the first and second wavelength routers producing wavelength optical signals from output ports in accordance with wavelengths included in a multiwavelength optical signal applied to input ports, each of the first and second wavelength routers comprising: M input ports to which a first multiwavelength optical signal is input, where M is a natural number; n output ports from which a plurality of second multiwavelength optical signals are output, where n is a natural number greater than the M, wherein a number of multiplexed wavelengths of the second multiwavelength optical signals is smaller than that of the first multiwavelength optical signal; and demultiplexing means for demultiplexing the first multiwavelength optical signal to the plurality of second multiwavelength optical signals, and for supplying each of the plurality of second multiwavelength optical signals to each one of the n output ports, wherein the wavelength router outputs the first multiwavelength optical signal from the M input ports when the second multiwavelength optical signals are input to the n output ports, and wherein the output ports of the first wavelength router are connected to the input ports of the switching means, and the input ports of the second wavelength router are connected to the output ports of the switching means.

The demultiplexing means may comprise a first wavelength router and the multiplexing means may comprise a second wavelength router, each of the first and second wavelength routers producing wavelength optical signals from output ports in accordance with wavelengths included in a multiwavelength optical signal applied to input ports, each of the first and second wavelength routers comprising: M input ports out of the n input ports to which a first multiwavelength optical signal is input, where M is a natural number less than the n; n-M output ports out of the n output ports from which a plurality of second multiwavelength optical signals are output, wherein a number of multiplexed wavelengths of the second multiwavelength optical signals is smaller than that of the first multiwavelength optical signal; demultiplexing means for demultiplexing the first multiwavelength optical signal to the plurality of second multiwavelength optical signals, and for supplying each of the plurality of second multiwavelength optical signals to each one of the n-M output ports; n-M input ports other than the M input ports, to which the second multiwavelength optical signals output from the n-M output ports are input; M output ports other than the n-M output ports, from each of which the first multiwavelength optical signal is output; and multiplexing means for multiplexing the second multiwave length optical signals into the first multiwavelength optical signal, wherein the M output ports of the first wavelength router are connected to the input ports of the switching means, and the M input ports of the second wavelength router are connected to the output ports of the switching means.

According to a fourth aspect of the present invention, there is provide a multiwavelength optical switch comprising: a plurality of demultiplexing means each including an input port and a plurality of output ports, for demultiplexing a first multiwavelength optical signal applied to the input port to a plurality of second multiwavelength optical signals whose number of multiplexed wavelengths is less than that of the first multiwavelength optical signal, and for producing the second multiwavelength optical signals from the output ports in accordance with wavelengths; and means for multiplexing the second multiwavelength optical signals fed from the plurality of demultiplexing means into the first multiwavelength optical signal.

Here, each of the demultiplexing means may be an optical wavelength device having one input port and n output ports, where n is a natural number.

According to a fifth aspect of the present invention, there is provide a multiwavelength optical switch connected to M multiwavelength transmission lines for transmitting a first optical signal whose number of multiplexed wavelengths is N, where M and N are natural numbers, the multiwavelength optical switch carrying out circuit switching between channels, the multiwavelength optical switch comprising: multiwavelength demultiplexer/multiplexer means including first input ports and first output ports connected to the M multiwavelength transmission lines, and M1 second input ports and M1 second output ports, where M1 is a natural number less than M, for demultiplexing the first optical signal fed to the first input ports into a plurality of second optical signals whose n umber of multiplexed wavelengths is P, where P is a natural number of $1 \leq P < N$, and outputting the second optical signals from the second output ports in accordance with their wavelengths, and for forming the first optical signals by multiplexing the second optical signals fed to the second input ports, and outputting the first optical signals from the first output ports; switching means for carrying out circuit switching of the second optical signals between the channels, the switching means including M input and output ports provided in correspondence with the second optical signals which are connected to the input and output ports of the switching means; and link means for connecting the input ports of the switching means with the second output ports of the multiwavelength demultiplexer/multiplexer means, and the output ports of the switching means with the second input ports of the multiwavelength demultiplexer/multiplexer means.

Here, the multiwavelength demultiplexer/multiplexer means may comprise M/M1 multiwavelength demultiplexer/multiplexers provided in input and output stages.

According to one aspect of the present invention, the wavelength router, whose wavelengths match those of the multiwavelength optical transmission lines connected to the router, demultiplexes the optical signals in the input stage and multiplexes the optical signals in the output stage of the multiwavelength optical switch. This makes it possible to share between the plurality of wavelengths the composition elements of the input and output stages, which are provided for each wavelength in a conventional system, thereby enabling the occupied area of the router to be saved. In addition, since the links between the matrix switch and the input and output stages are multiplexed, the number of links which cross tri-dimensionally is also reduced. Using the wavelength routers and ribbon optical fibers in the matrix switch can also save the area. Moreover, sharing one wavelength router between the input and output stages for carrying out demultiplexing and multiplexing makes it possible to further reduce the size of the multiwavelength optical switch. Thus, tri-dimensional wiring and cross connection of optical fibers are reduced, which makes it possible to improve a space factor and reduce process steps for fabricating the optical switch.

According to another aspect of the present invention, using the multiwavelength demultiplexer/multiplexer which is connected to M optical transmission lines and to sets of M1 multiwavelength lines can reduce the number of composition elements of the input and output stages from 2M to M/M1. This makes it possible to reduce the number of wiring, thereby enabling larger scale integration of the multiwavelength optical switch.

BRIEF DESCRIPTION OF THE DRAWINGS

The above and other objects, effects, features and advantages of the present invention will become more apparent from the following description of the embodiments thereof taken in conjunction with the accompanying drawings, in which;

FIG. 2 is a matrix chart illustrating wavelength characteristics of the ports of a wavelength router for converting an optical signal with a wavelength multiplexed number of 9 to an optical signal with a wavelength multiplexed n number of 3 in the first embodiment as shown in FIG. 1;

FIG. 12 is a matrix chart illustrating wavelength selecting characteristics across the input and output ports of the wavelength router as shown in FIG. 11;

FIG. 19 is a matrix chart illustrating wavelength characteristics across the ports of the wavelength router as shown in FIG. 18;

FIG. 22 is a matrix chart illustrating wavelength selecting characteristics of the wavelength router as shown in FIG. 21;

FIG. 25 is a matrix chart illustrating wavelength selecting characteristics of a multi-input wavelength demultiplexer and multiplexer as shown in FIG. 24; and FIG. 26 is a diagram functionally illustrating a configuration of the ports of the multi-input wavelength demultiplexers and multiplexers as shown in FIG. 24.

DESCRIPTION OF THE PREFERRED EMBODIMENTS

Preferred embodiments of the multiwavelength optical switch in accordance with the invention will now be described with reference to the accompanying drawings.

EMBODIMENT 1

Figure 1:
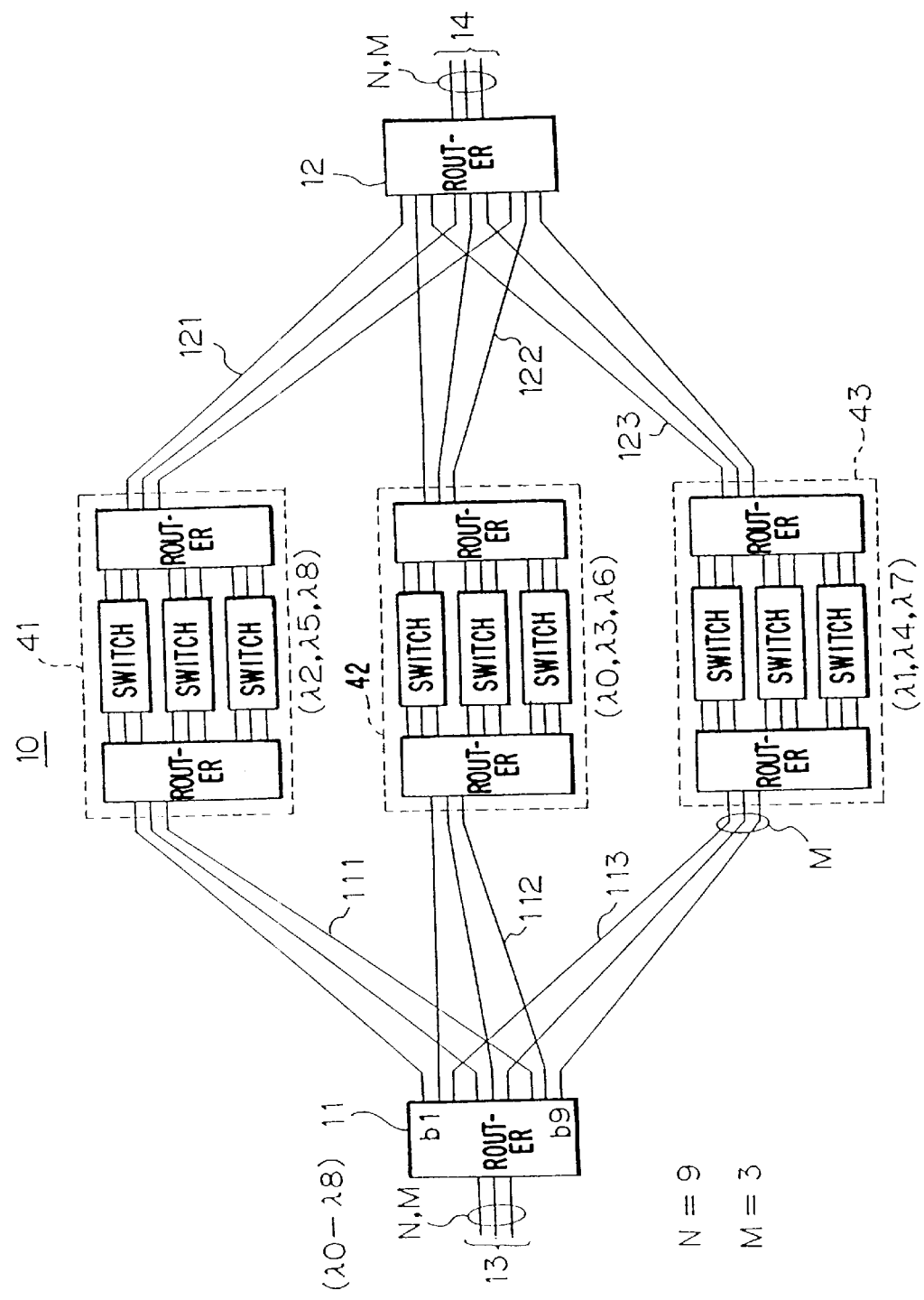
FIG. 1 is a schematic, functional block diagram showing a configuration of a multiwavelength optical switch system in accordance with a first embodiment of the present invention.

FIG. 1 is a schematic, functional block diagram showing a first embodiment of a multiwavelength optical switch in accordance with the present invention. The multiwavelength optical switch system 10 comprises wavelength routers 11 and 12. The wavelength router 11 is connected to incoming paths 13 consisting of multiwavelength optical transmission lines, such as optical fibers, and the wavelength router 12 is connected to outgoing paths 14 also consisting of multiwavelength optical transmission lines, thereby forming a circuit switching system for connecting a desired wavelength channel of the incoming paths 13 to any desired one of the outgoing paths 14.

The wavelength routers 11 and 12 can have the same logic configuration as shown in FIG. 2. Each wavelength router has a port set a consisting of nine ports #1–#9, and a port set b consisting of nine ports #1–#9. The ports a1–a9 and b1–b9 have the wavelength selecting characteristics as shown in FIG. 2 in the form of a matrix 15. When an optical signal including multiple wavelengths λ0–λ8 is input to each of the ports a1–a9, the signal is routed such that optical signals are output of the wavelengths as shown in each column of the ports b1–b9 of the matrix 15. Analogously, when an optical signal including the wavelengths λ0–λ8 is input to each of the ports b1–b9, the signal is routed such that optical signals are output of the wavelengths as shown in each row of the ports a1–a9 of the matrix 15.

Figure 3:
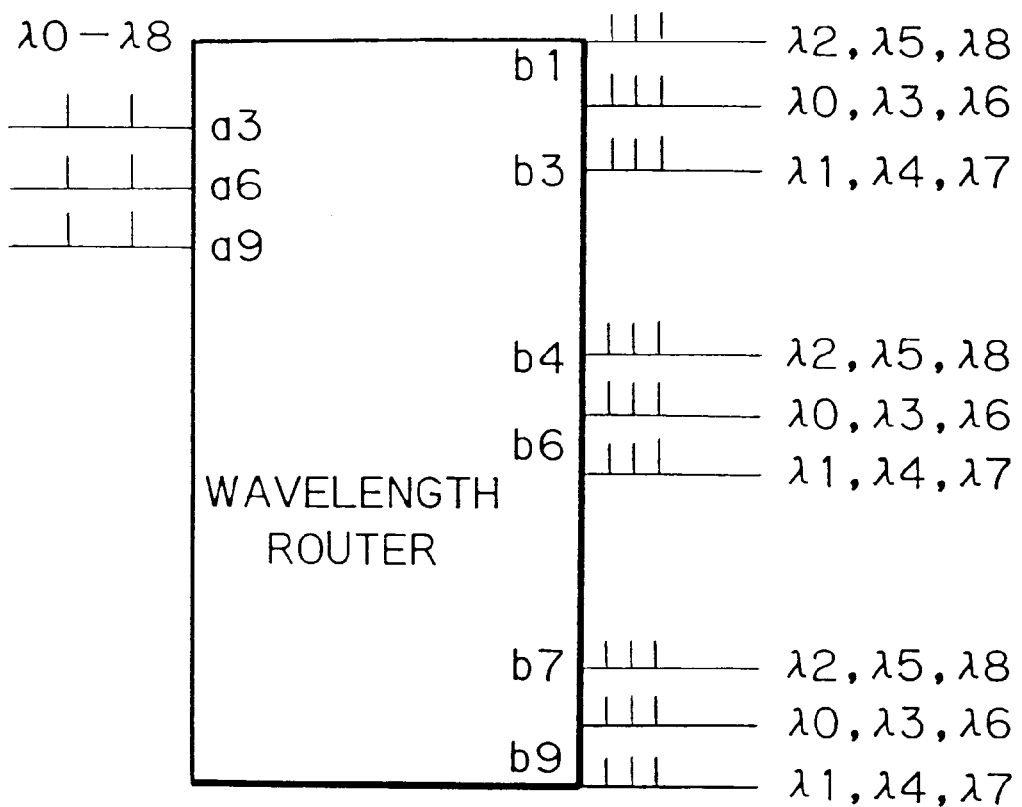
FIG. 3 is a functional block diagram showing relationships between the port configuration and wavelengths of the wavelength router of FIG. 2.

FIG. 3 is a functional diagram illustrating the relationships between the ports and the wavelengths used by the wavelength routers 11 and 12. For example, when an optical signal with a multiplexed number of 9 including wavelengths λ0–λ8 is input to the ports a3, a6 and a9, the wavelength router 11 (or 12) demultiplexes the input signal in accordance with the matrix 15, and outputs from the ports b1–b9 optical signals with a multiplexed number of 3, a set of wavelengths λ2, λ5, λ8, a set of wavelengths λ3, λ6, λ0, and a set of wavelengths λ1, λ4, λ7. Reversely, when the optical signals with the multiplexed number of 3 are input to the ports b1–b9, the wavelength router multiplexes them in accordance with the matrix 15, and outputs the signal with the multiplexed number of 9 from the ports a3, a6 and a9. In the embodiment of FIG. 1, the wavelength router 11 functions as a wavelength demultiplexer that demultiplexes the multiwavelength signal input to the plurality of ports, whereas the wavelength router 12 functions as a multiplexer that multiplexes the multiwavelength signals fed to the plurality of ports.

Figure 4:
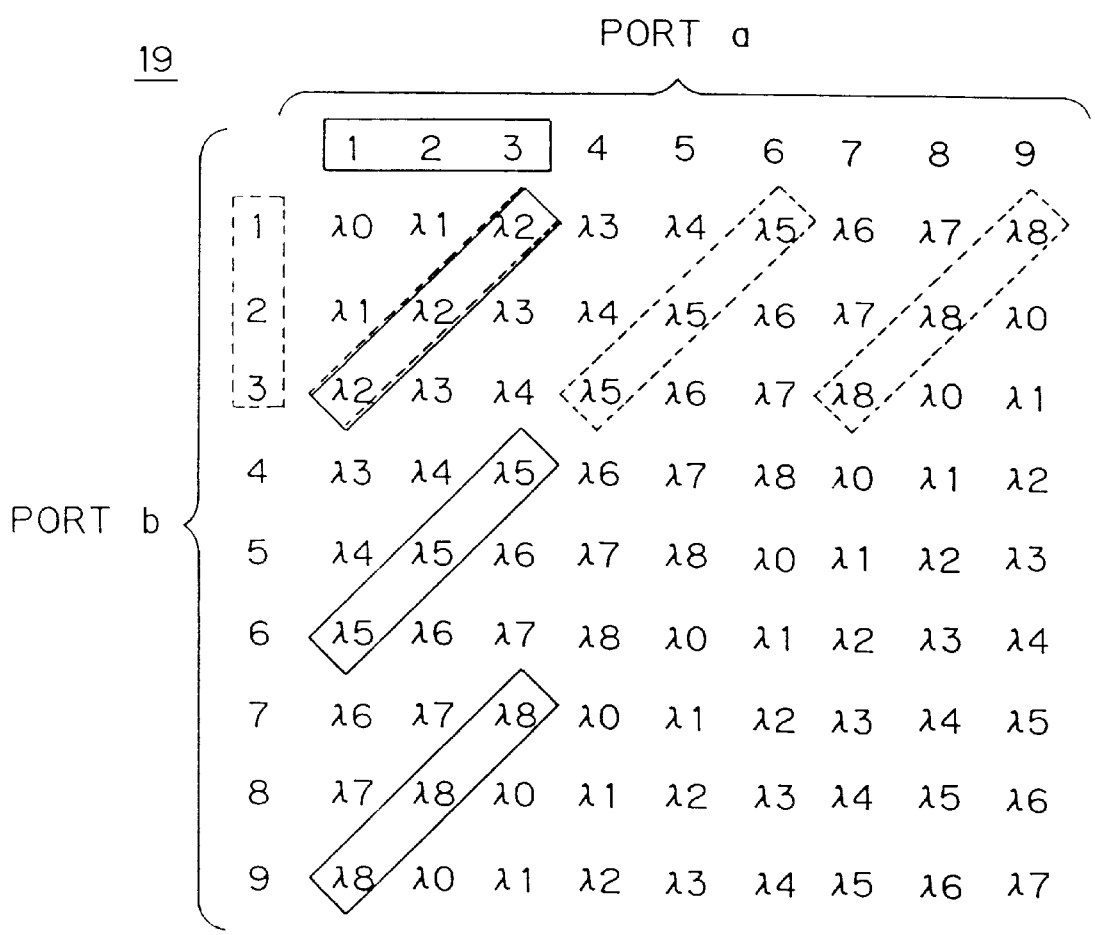
FIG. 4 is a matrix chart illustrating wavelength characteristics of the ports of the wavelength router for converting an optical signal with a wavelength multiplexed number of 3 to an optical signal with a single wavelength in the first embodiment shown in FIG. 1.

FIG. 4 illustrates a matrix 19 which represents the relationships between the input and output ports and the wavelengths when multiwavelength signals each including 3 wavelengths out of 9 wavelengths λ0–λ8 are input to the ports a1–a9 and b1–b9. When a multiplexed signal of wavelengths λ0, λ3 and λ6 is input to the ports a2, a3 and a4, a multiplexed signal of wavelengths λ1, λ4 and λ7 is input to the ports a1, a2 and a9, or a multiplexed signal of wavelengths λ2, λ5 and λ8 is input to the ports a1, a2 and a3, three wavelengths of each set of the three wavelengths are output from the consecutive ports b1–b3, b4–b6 and b7–b9, which is a feature of the wavelength router.

Figure 5:
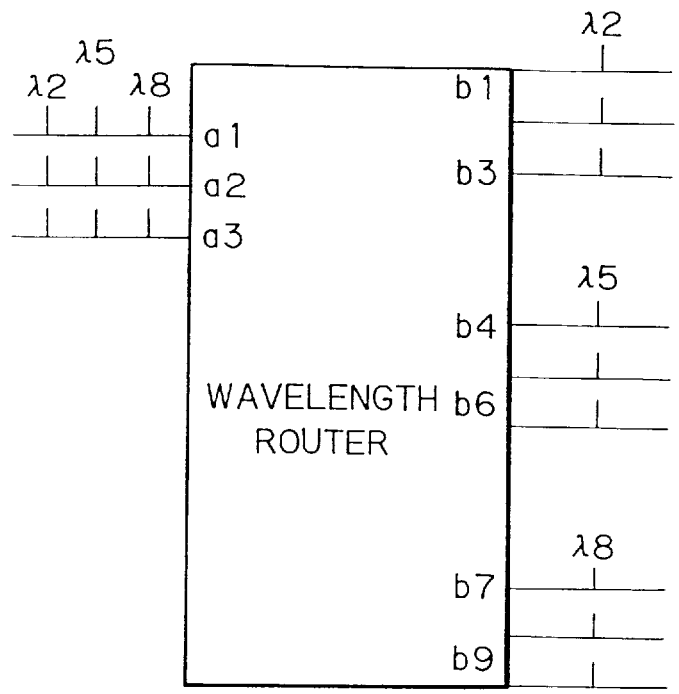
FIG. 5 is a functional block diagram showing relationships between the port configuration and wavelengths of the wavelength router of FIG. 4.

FIG. 5 is a functional block diagram illustrating an example of a wavelength router 21 or 22 in accordance with such a matrix 19. The wavelength router 21 or 22 demultiplexes the 3-multiplexed optical signal into a single wavelength signal by passing it from the ports a to ports b, and multiplexes three single wavelength optical signals by passing it from the ports b to the ports a.

Figure 6:
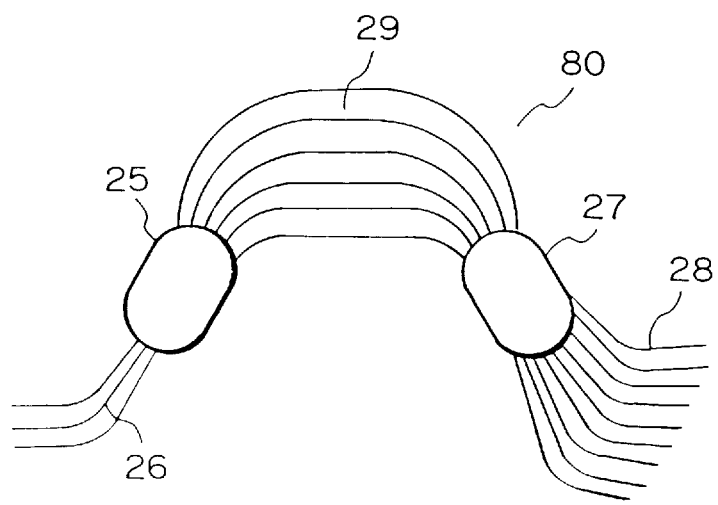
FIG. 6 is a diagram schematically illustrating the structure of the wavelength routers as shown in FIGS. 3 and 5.

FIG. 6 schematically illustrates an example of the structure of the foregoing individual wavelength routers 11, 12, 21 and 22. In this embodiment, the optical wavelength routers 11, 12, 21 and 22 are each formed on an optical distributing substrate 80 in a planar fashion. Plane waveguides 25 and 27 are formed on the optical distributing substrate 80, and interconnected through a waveguide array 29. The first plane waveguide 25 has ports a1, a2 and a3, to which a waveguide array 26 is connected. The second plane waveguide 27 has ports b1–b9, to which another waveguide array 28 is connected. The waveguide array 29 for the interconnection is also formed on the optical distributing substrate 80 in a planar fashion. With this configuration, the wavelength router demultiplexes a multiwavelength optical signal traveling through the waveguides in one direction, and multiplexes a plurality of optical signals traveling in the other direction. Assuming that the number of the input ports a and that of the output ports b of the wavelength router 11, 12, 21 or 22 are both n, where n is a natural number, 4 the number of ports is M which are associated with signals whose number of multiplexed wavelengths is N, the number of ports n becomes n=N×M. Since the upper limit of the number of the input or output ports is estimated to be 144, a wavelength router with M=12 and N=12 can be realized. As to a wavelength spacing, M multiple of the wavelength in the closest packed state is employed, that is, wavelengths λ (M×i+Mo) are used, where i=1, 2, 3 . . . , and Mo is a fixed value.

Figure 7:
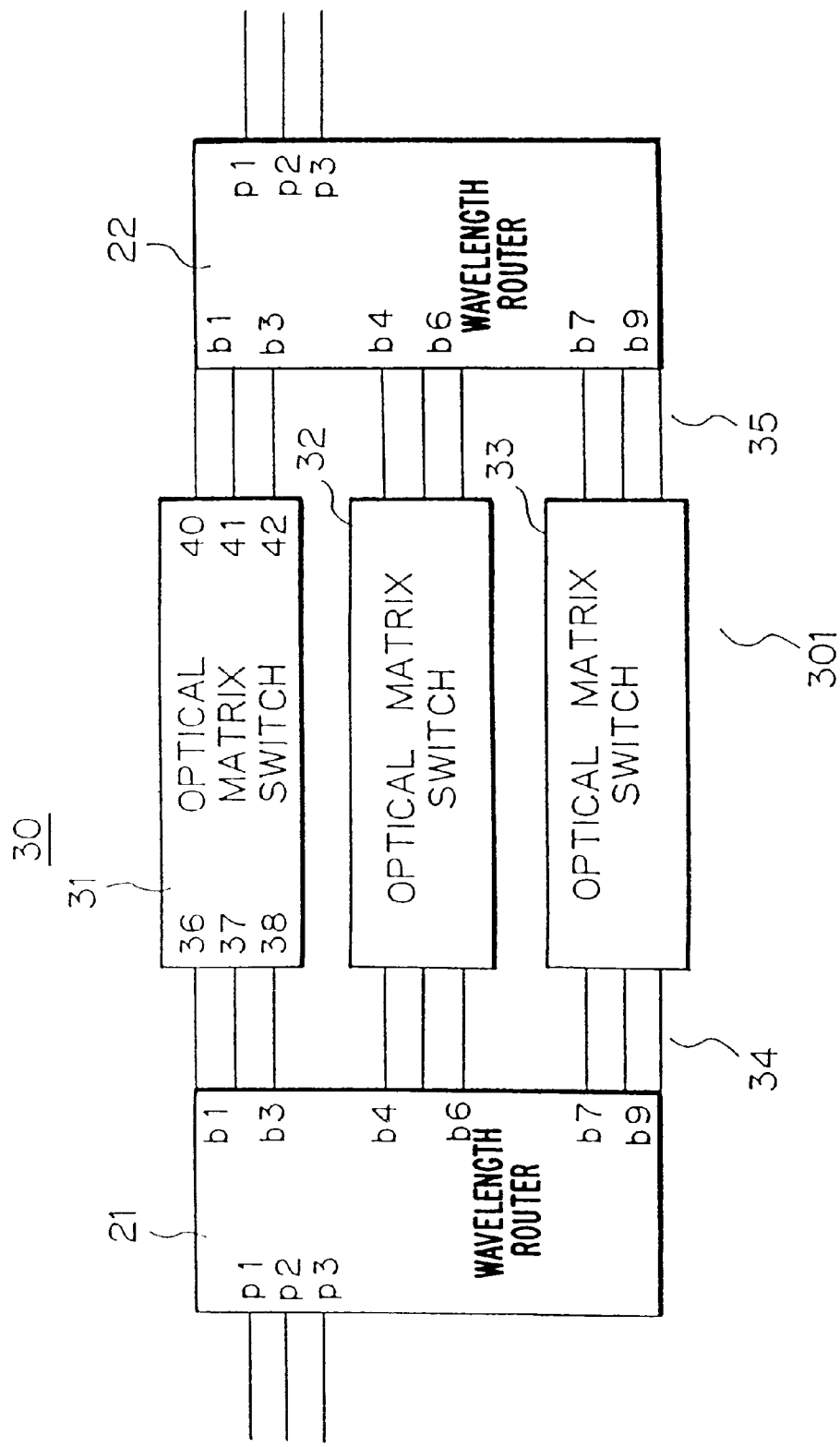
FIG. 7 is a functional block diagram showing an arrangement of a 3×3 wavelength switch in accordance with the first embodiment shown in FIG. 1.

FIG. 7 shows a multiwavelength optical switch 30. The multiwavelength optical switch 30 is composed of a optical distributing substrate 301, the wavelength routers 21 and 22 formed on the substrate as shown in FIG. 5, and optical matrix switches 31, 32 and 33 which are connected to the wavelength routers 21 and 22 through optical connecting paths or optical fiber links formed on the optical distributing substrate 301. Since the output ports b1–b3 of the wavelength routers and the ports 36–38 and 40–42 of the optical matrix switch 31 are each consecutive ports, the links 34 and 35 can be realized with a ribbon fiber consisting of a plurality of parallel waveguides. This makes it possible to obviate tri-dimensional cross links which were necessary to connect between individual switches in the conventional optical matrix switches.

In this embodiment, each of the optical matrix switches 31, 32 and 33 is a 3×3 optical wavelength switch which is disposed on the optical distributing substrate 301, and which outputs single wavelength signals applied to the input ports 36, 37 and 38 to any desired one of the output ports 40, 41 and 42 by switching the input signals in response to an external control signal.

The wavelength routers 21 and 22 can be of the same configuration, each of which is 9×9 optical routing device whose number of ports is 3 and the multiplexing number of the wavelengths is 3. The wavelength router 21 at the input stage has input ports p1, p2 and p3 which correspond to the foregoing wavelengths, and to which one of the sets of multiwavelength optical signals (λ0, λ3, λ6), (λ1, λ4, λ7) and (λ2, λ5, λ8) are input, respectively, so that these signals are demultiplexed, and three single wavelength optical signals are output from the output ports b1–b3, b4–b6 and b7–b9, respectively. On the other hand, the wavelength router 22 at the output stage multiplexes the three single wavelength optical signals fed to the incoming ports b1–b3, b4–b6 and b7–b9, and outputs them to the corresponding ports p1, p2 and p3. The optical matrix switches 31, 32 and 33 each have incoming ports 36–38 and outgoing ports 40–42, which correspond to the ports p1, p2 and p3 of the wavelength routers 21 and 22, and output the input wavelength optical signals from desired outgoing ports by the switching operation of the optical matrix switches 31, 32 and 33.

Returning to FIG. 1, the wavelength routers 11 and 12 of the multiwavelength optical switch system 10 set the number M of the input ports and that of the output ports at 3, and the number of multiplexed wavelengths N at 9, by using the matrix 15 whose number n' of the input ports and that of the output ports are both 9, and whose number N' of multiplexed wavelengths is also 9. The wavelength router 11 reduces to N/M=3 the number of the multiplexed wavelengths of the multiwavelength optical signals λ0–λ8 which are applied to the ports a3, a6 and a9 through the incoming paths 13 as shown in FIG. 3, and outputs the optical signals whose number of multiplexed wavelengths is 3 from the outgoing ports b1–b9. The output ports b1–b9 are connected to the input ports of multiwavelength optical switches 41, 42 and 43 corresponding to the three wavelengths through three (M=3) links 111–113 (FIG. 1), each transmitting the same three wavelengths as shown in FIG. 3. The multiwavelength optical switches 41, 42 and 43 have output ports which are connected to the input ports b1–b9 of the wavelength router 12 through links 121–123.

Figure 10:
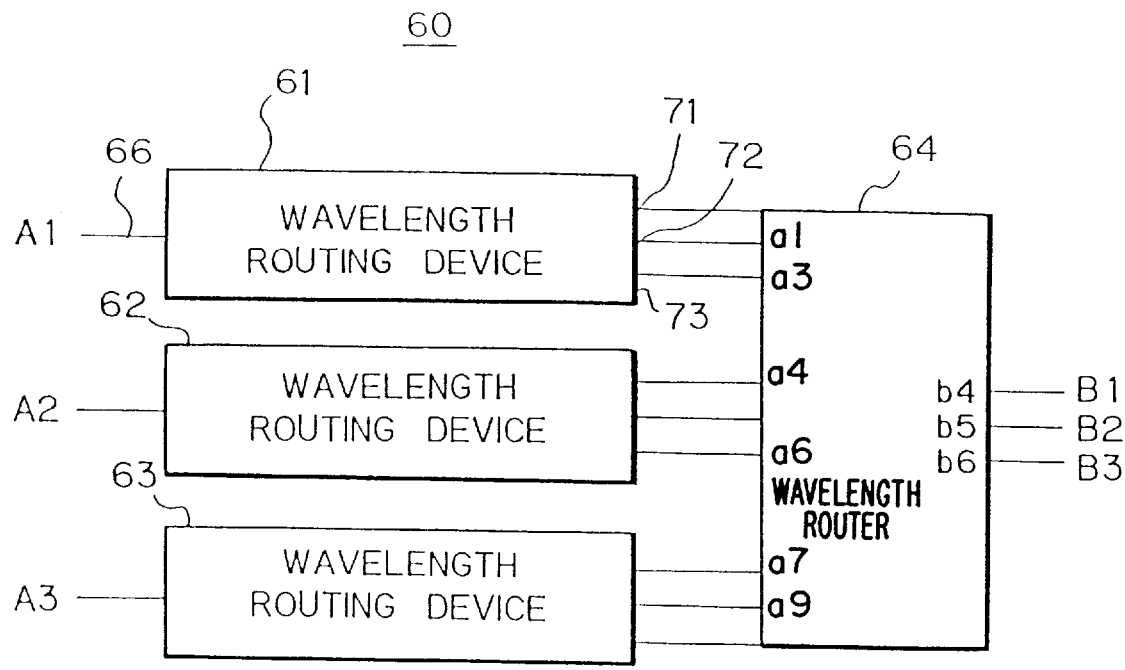
FIG. 10 is a functional block diagram showing a multiwavelength optical switch in accordance with a third embodiment of the present invention.

The multiwavelength optical switches 41, 42 and 43 are each composed of multiwavelength switch 30 or 60 as shown in FIG. 7 or FIG. 10, and are provided in correspondence with the wavelength sets ($\lambda 2, \lambda 5, \lambda 8$), ($\lambda 0, \lambda 3, \lambda 6$) and ($\lambda 1, \lambda 4, \lambda 7$) as shown in FIG. 1. The switches 41, 42 and 43 receive optical signals at the incoming ports corresponding to multiwavelengths ($\lambda 2, \lambda 5, \lambda 8$), ($\lambda 0, \lambda 3, \lambda 6$) and ($\lambda 1, \lambda 4, \lambda 7$), respectively, through the links 111–113, and connect these multiwavelength signals to the links 121–123 corresponding to the outgoing ports by circuit connection. Thus, an optical signal of a desired wavelength fed to a desired incoming port can be output from a desired outgoing port.

In the multiwavelength optical switch system 10, each of the wavelength routers is a combination of M multiwavelength selectors, each corresponding to a different wavelength and employed in a conventional highway switch without using the multiple links, where M is the number of ports. Accordingly, the number of the devices in the input and output stages will be reduced by a factor of M as compared with the conventional system, and hence the number of the links connected to the devices will also be reduced by a factor of M in comparison with that of the conventional system. Furthermore, the switches 41–43 as shown in FIG. 1 employ for internal connection the ribbon optical fibers described with reference to the multiwavelength optical switch 30 shown in FIG. 7, and are formed flat on the optical distributing substrate.

EMBODIMENT 2

Figure 8:
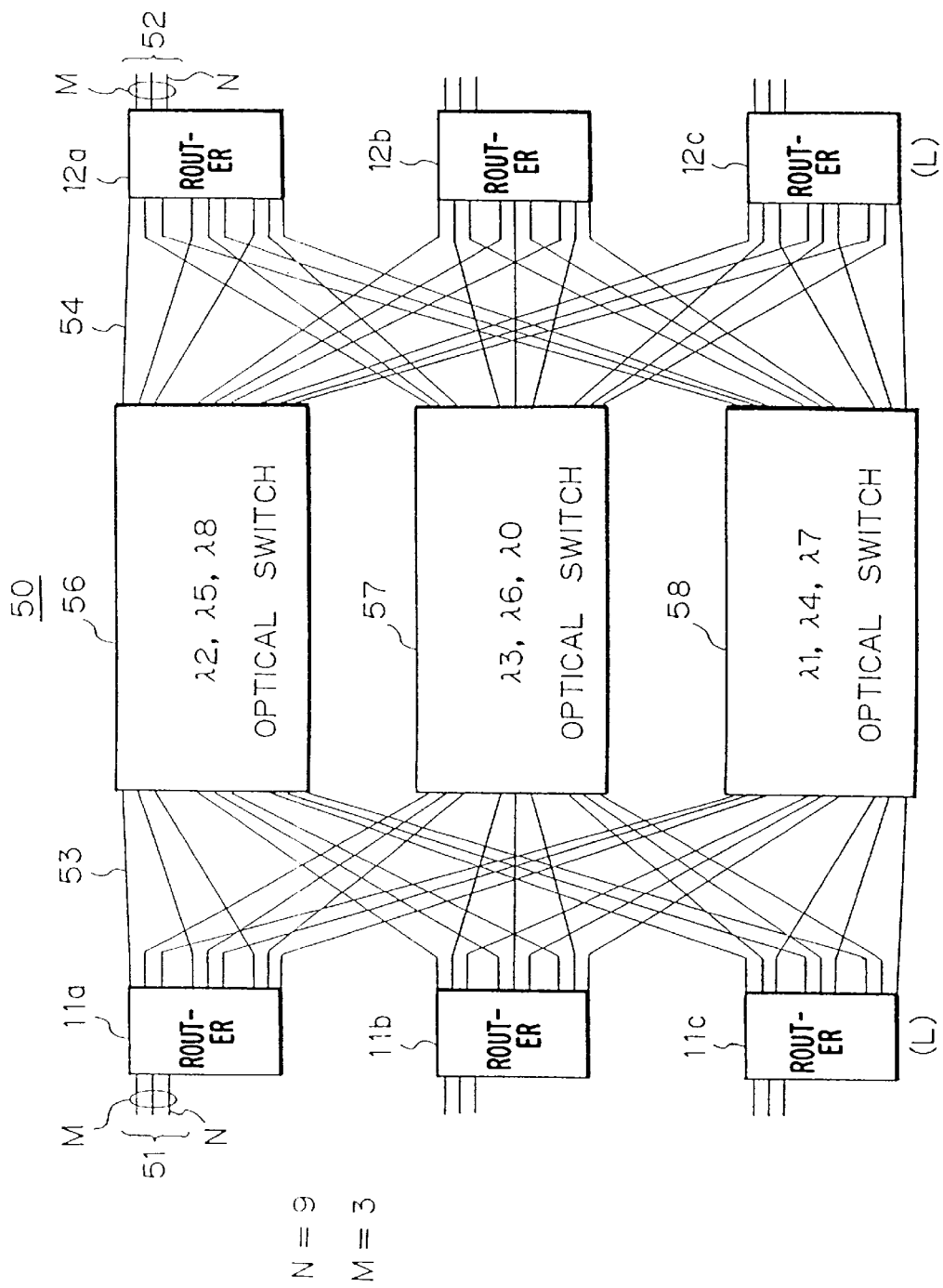
FIG. 8 is a functional block diagram showing a multiwavelength optical switch system in accordance with a second embodiment of the present invention.

FIG. 8 is a block diagram of a multiwavelength optical switch 50 as a second embodiment of the present invention. Wavelength routers 11a, 11b and 11c in the input stage, and wavelength routers 12a, 12b and 12c in the output stage can be of the same configuration as the wavelength routers 11 and 12 as shown in FIG. 3. The ports a3, a6 and a9 of these wavelength routers are connected to the incoming and outgoing paths 51 and 52 of optical signals consisting of 9 multiwavelengths f0–f8. Accordingly, each wavelength router of the input and output stages of this embodiment has the port number M=3, and the multiplexed number per port N=3, and the number of routers per stage L=3. The respective wavelength routers 11a, 11b and 11c output three sets of 3 multiwavelength signals ($\lambda 2, \lambda 5, \lambda 8$), ($\lambda 0, \lambda 3, \lambda 6$) and ($\lambda 1, \lambda 4, \lambda 7$) with the multiplexed number N/M being three, and supply them through a link 53 to multiwavelength optical switches 56, 57 and 58 corresponding to the wavelength signals.

Figure 9:
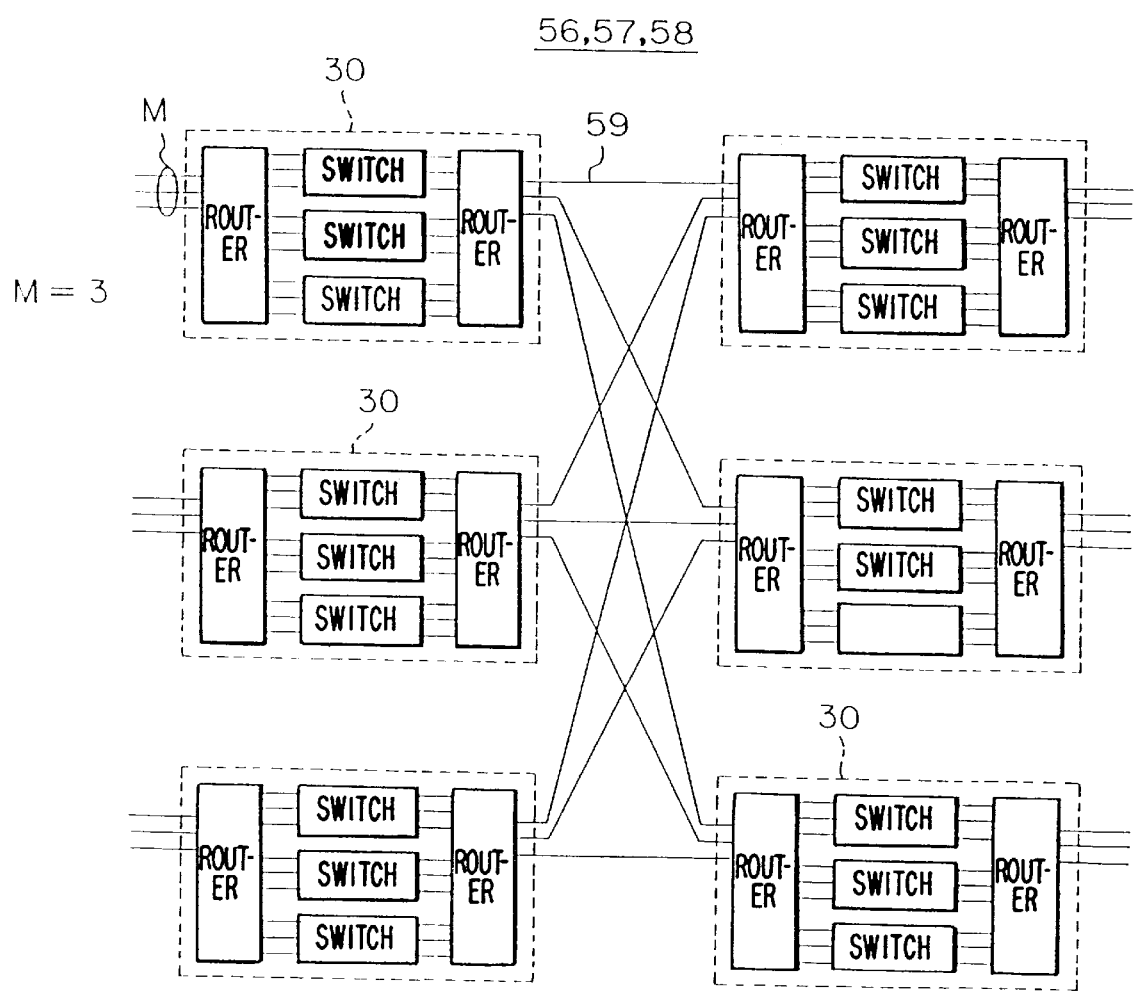
FIG. 9 is a functional block diagram showing a configuration of a 9×9 multiwavelength optical switch system in accordance with the second embodiment as shown in FIG. 8.

FIG. 9 is a circuit diagram showing a part (2 stages out of 3 stages) of the multiwavelength optical switches 56, 57 and 58. The multiwavelength optical switches 56, 57 and 58 in this embodiment are a 9×9 non-block multiwavelength optical switch, in which six multiwavelength optical switches 30 as shown in FIG. 7 are interconnected through a junctor 59 as shown in FIG. 9, and to which multiwavelength optical signals with the multiplexed number of 3 are input. The switches 56, 57 and 58 as shown in FIG. 8 demultiplex 3-multiwavelength signals fed from the nine incoming paths 51 of the link 53, and switch to the link 54 corresponding to the desired nine outgoing paths 52 in accordance with the wavelengths. The total number of the links 53 and 54 of the router of the multiwavelength optical switch 50 as shown in FIG. 8 is calculated as $2 \times L \times M \times N = 2 \times 3 \times 3 \times 9/3 = 54$ taking account of the 3-wavelength multiplexing. This means that the number of cross links in the input and output stages is reduced by a factor of 3 as compared with the conventional system. In addition, the wavelength selectors provided for respective transmission paths in the input and output stages of the conventional highway switch are replaced with the routers corresponding to the plurality of transmission paths, and hence the number of interconnecting links in the input and output stages is reduced. As a result, the space factor of the input and output stages is improved, the size of the switches is shrunk, and the assembly of the switches is facilitated.

EMBODIMENT 3

FIG. 10 is a block diagram of a multiwavelength optical switch 60 of a third embodiment in accordance with the present invention. The multiwavelength optical switch 60 is planarly formed on an optical distributing substrate 90, as shown in FIG. 11, with wavelength routing devices 61, 62 and 63 connected to incoming paths A1, A2 and A3, and to a wavelength router 64 connected to outgoing paths B1, B2 and B3.

Figure 11:
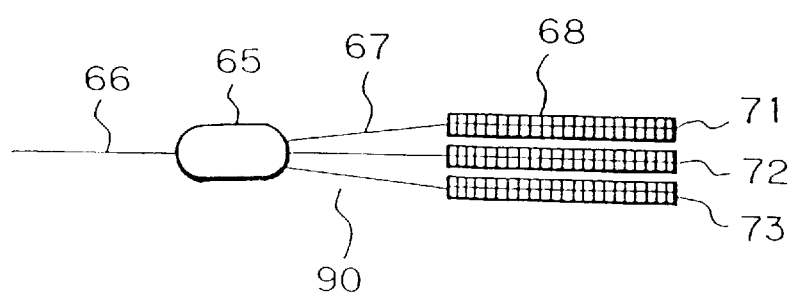
FIG. 11 is a diagram schematically illustrating an example of a wavelength router with a single input port and a plurality of output ports in the third embodiment as shown in FIG. 10.

FIG. 11 is a diagram showing a, particular structure of the wavelength routing devices 61, 62 and 63, each of which includes a plane waveguide 65 which outputs from each of optical paths 67 an optical multiwavelength signal including three wavelengths $\lambda 0, \lambda 1$ and $\lambda 3$ applied to an input port 66 connected to one of the incoming paths A1, A2 and A3, and supplies the optical multiwavelength signal to each one of multiwavelength selecting filters 68 consisting of an acousto-optic (AO) filter or the like. The multiwavelength selecting filters 68 each have their own proper selecting wavelengths, and output optical signals of the proper wavelengths from output ports 71, 72 and 73 after filtering the respective optical signals input to the optical paths 67. The output ports 71, 72 and 73 are connected to the wavelength router 64 as shown in FIG. 10. The wavelength router 64 has a function similar to that of the wavelength routers 11 and 12 as shown in FIG. 6, and its wavelength selecting characteristics are shown in FIG. 12 in the form of a matrix 75.

The wavelength routing devices 61, 62 and 63 each output from the output ports 71, 72 and 73 optical signals including wavelengths as shown in different columns of respective blocks 76, 77 and 78 in the matrix 75. The wavelength router 64 receives the optical signals at the input ports a1–a3, a4–a6 and a7–a9, and outputs from the ports b4, b5 and b6 multiwavelength optical signal containing three wavelengths as shown in the rows of the blocks 76, 77 and 78. The wavelengths on the incoming path can be connected to a desired outgoing path by selecting, by using an external control signal, the arrangement of the wavelengths $\lambda 0, \lambda 1$ and $\lambda 2$ output from the output ports 71, 72 and 73 of the multiwavelength selecting filters 68 in the wavelength routing devices 61, 62 and 63. Thus, the multiwavelength optical switch 60 can be used in place of the multiwavelength optical switch 30.

EMBODIMENT 4

Figure 13:
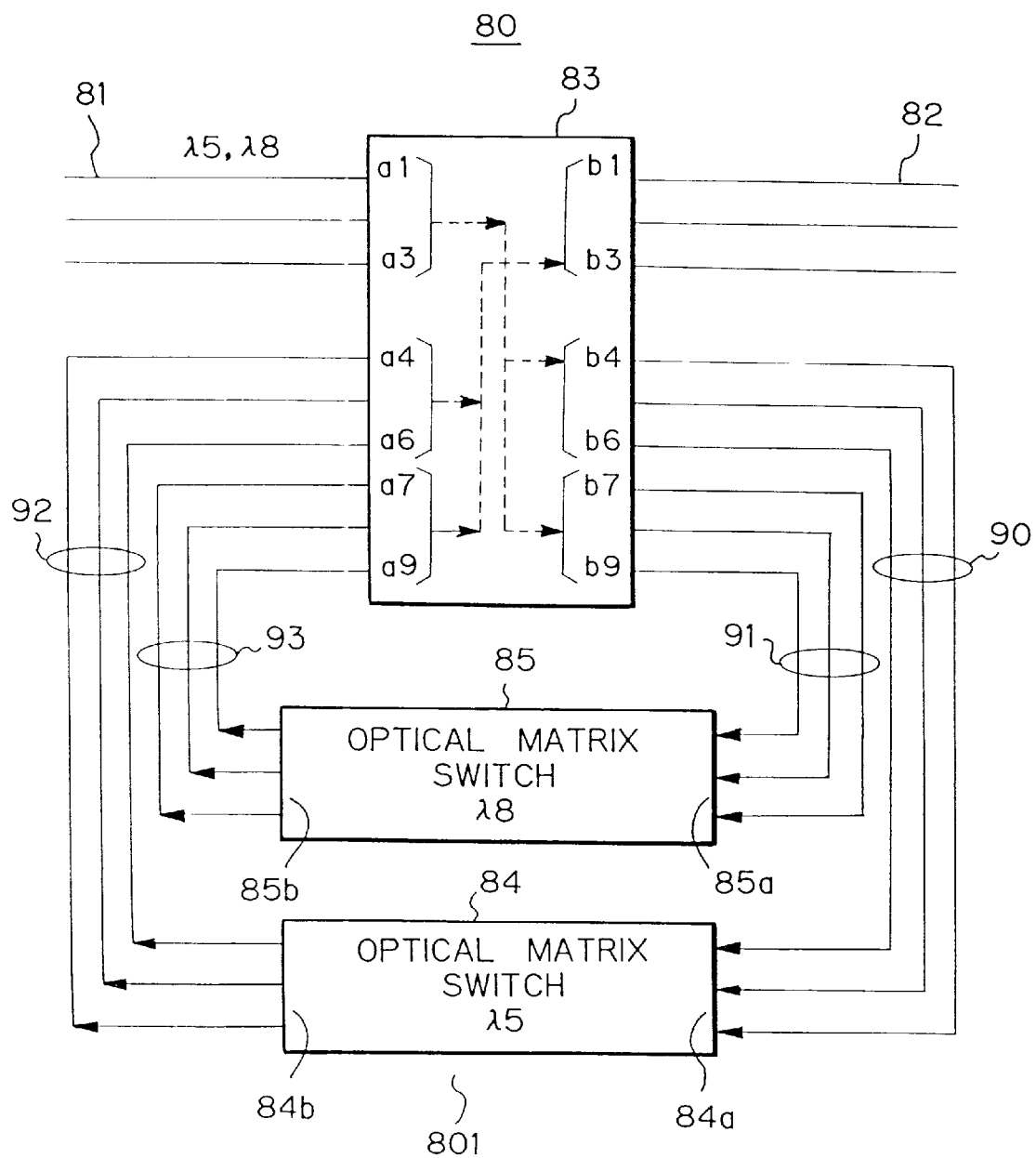
FIG. 13 is a functional block diagram showing a multiwavelength optical switch in accordance with a fourth embodiment of the present invention.

FIG. 13 is a block diagram showing the configuration of a multiwavelength optical switch 80 of a fourth embodiment in accordance with the present invention. The multiwavelength optical switch 80 comprises a wavelength router 83 connected to optical transmission lines 81 and 82, for demultiplexing and multiplexing the multiwavelength optical signals, and optical matrix switches 84 and 85 for circuit switching.

Figure 14:
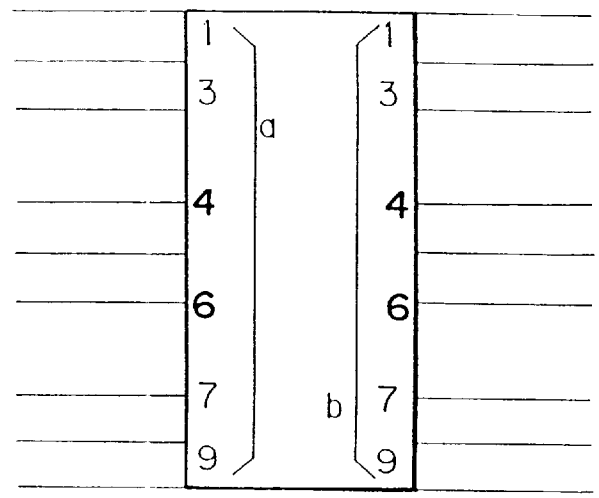
FIG. 14 is a functional block diagram showing a port arrangement of the wavelength router in accordance with the fourth embodiment as shown in FIG. 13.
Figure 16:
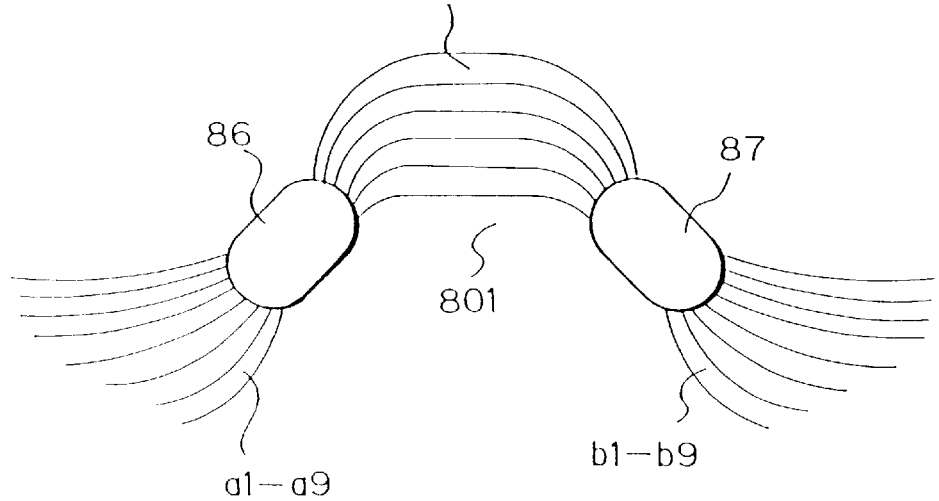
FIG. 16 is a diagram schematically illustrating an example of the structure of the wavelength router as shown in FIG. 15.
Figure 15:
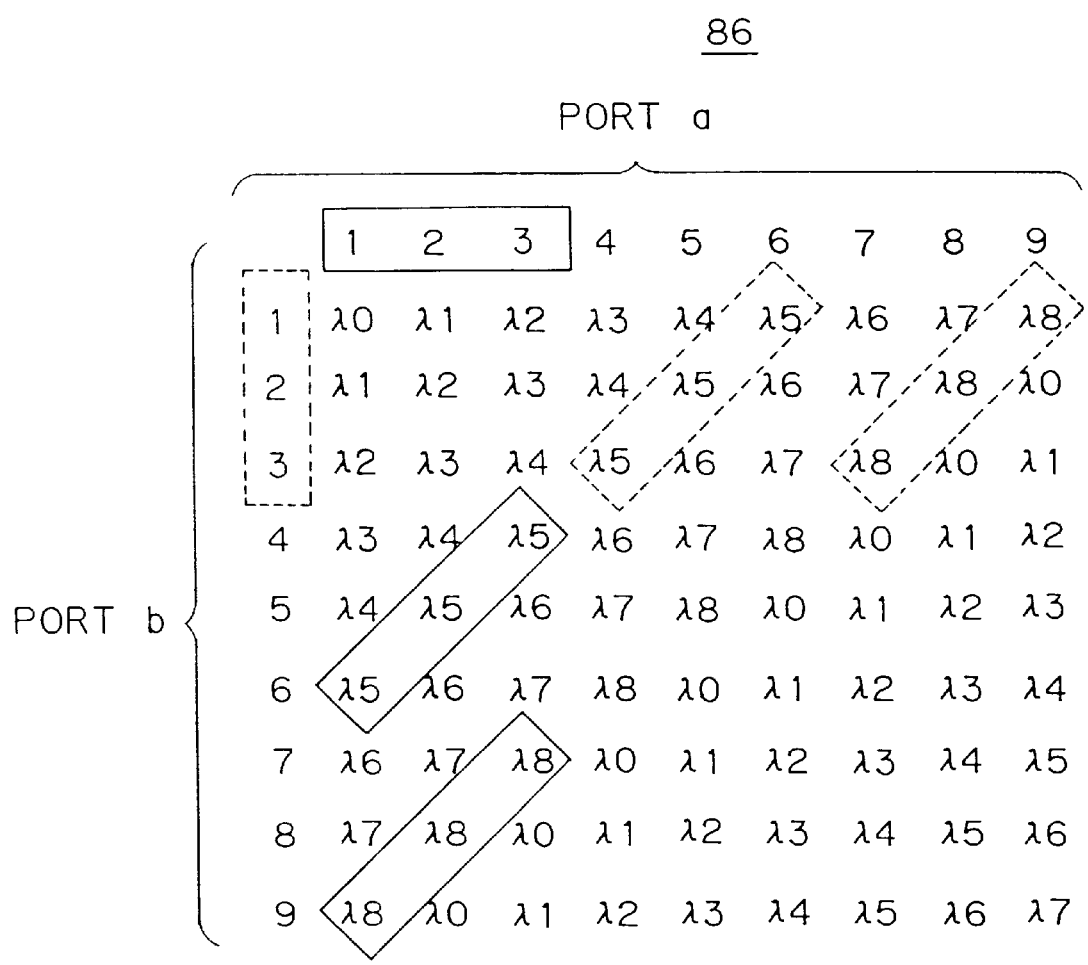
FIG. 15 is a matrix chart illustrating wavelength characteristics of the ports of the wavelength router as shown in FIG. 14.

FIG. 14 is a schematic diagram of the wavelength router 83, and FIG. 15 shows a matrix 86 illustrating the wavelength characteristics of the demultiplexing and multiplexing of the wavelengths at the input ports a1–a9 and output ports b1–b9 shown in FIG. 14. FIG. 16 schematically illustrates an example of the wavelength router 83 in its single form. The wavelength router 83 comprises a plane waveguide 86 connected to the input ports a1–a9, a plane output waveguide 87 connected to the output ports b1–b9, and a waveguide array 88 connecting the two waveguides. Elements 86–88 are formed on an optical distributing substrate 801. The waveguide array 88 consists of a plurality of waveguides of different length.

The multiwavelength optical switch 80 as shown in FIG. 13 uses its input ports a1–a9 and output ports b1–b9 by dividing them into three sections, respectively. More specifically, the input ports a1–a3 are connected to three optical transmission lines 81, and the output ports b1–b3 are also connected to three optical transmission lines 82. Output ports b4–b6 and b7–b9 are connected to input ports 84a and 85a, respectively, of 3×3 optical matrix switches 84 and 85, respectively through links 90 and 91, respectively, of an optical connecting circuit. Output ports 84b and 85b of the optical matrix switches 84 and 85 are connected to the input ports a4–a6 and a7–a9, respectively, of the wavelength router 83 through links 92 and 93 respectively. The wavelength router 83 receives at the input ports a1–a3 a multiwavelength optical signal including wavelengths $\lambda 5$ and $\lambda 8$ fed through the optical transmission lines 81, demultiplexes the signal into a signal of the wavelength $\lambda 5$ and a signal of the wavelength $\lambda 8$, and outputs the former from the output ports b4–b6, and the latter from the output ports b7–b9. These signals are supplied through the links 90 and 91 to the optical matrix switches 84 and 85 which carry out routing for selecting desired output transmission lines 82 of the signals with wavelengths $\lambda 5$ and $\lambda 8$. The wavelength signals $\lambda 5$ and $\lambda 8$ output from the optical matrix switches 84 and 85 pass through the links 92 and 93, respectively, to be input to the input ports a4–a6 and a7–a9, respectively, of the wavelength router 83, which multiplexes them to be output from the output ports b1–b3.

EMBODIMENT 5

Figure 17:
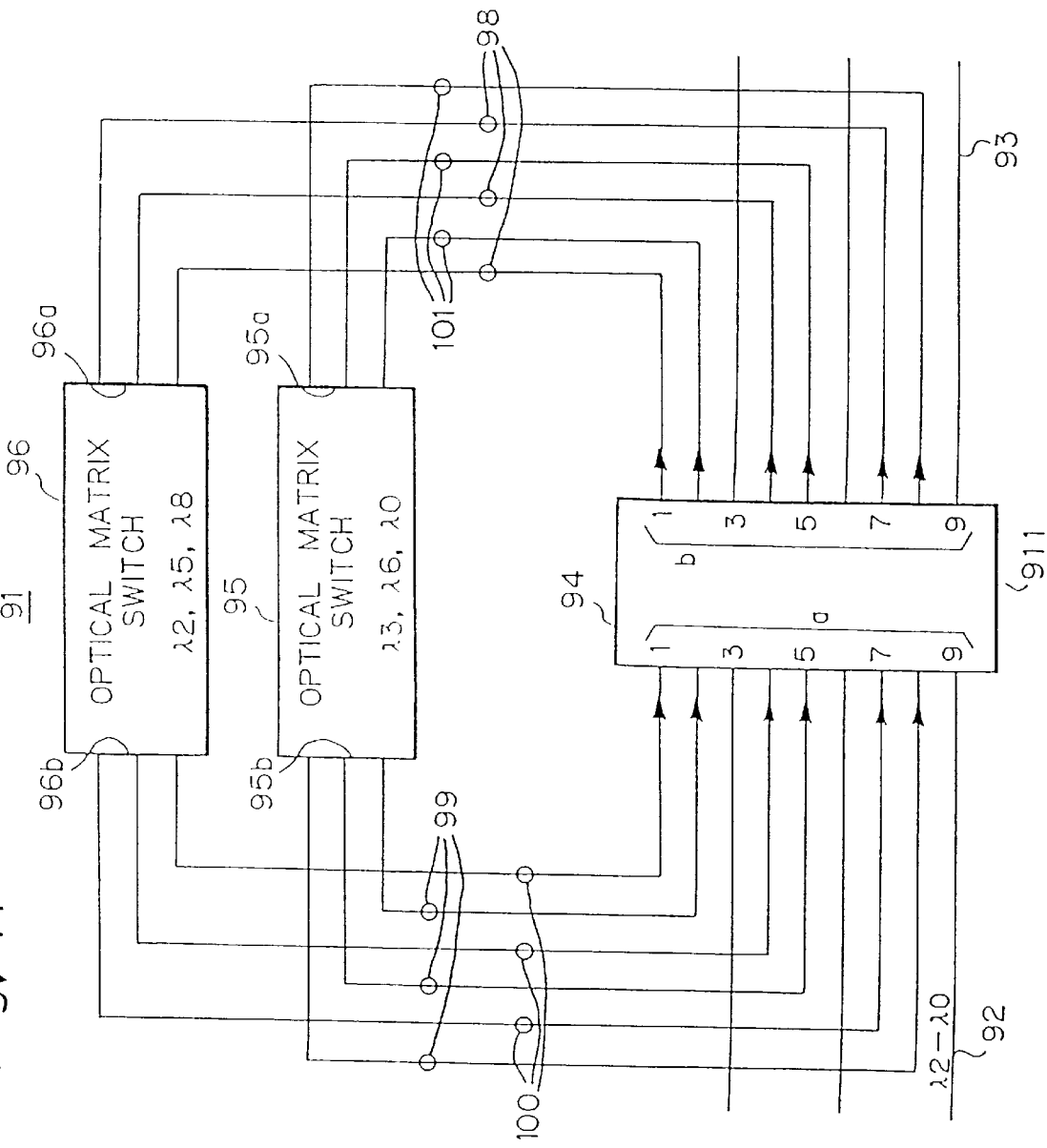
FIG. 17 is a functional block diagram showing a multiwavelength optical switch in accordance with a fifth embodiment of the present invention.

FIG. 17 is a functional block diagram showing a multiwavelength optical switch 91 of a fifth embodiment in accordance with the present invention. The multiwavelength optical switch 91 comprises a wavelength router 94 and optical matrix switches 95 and 96. The wavelength router 94 is connected to optical transmission lines 92 and 93, and performs demultiplexing and multiplexing of multiwavelength optical signals.

Figure 18:
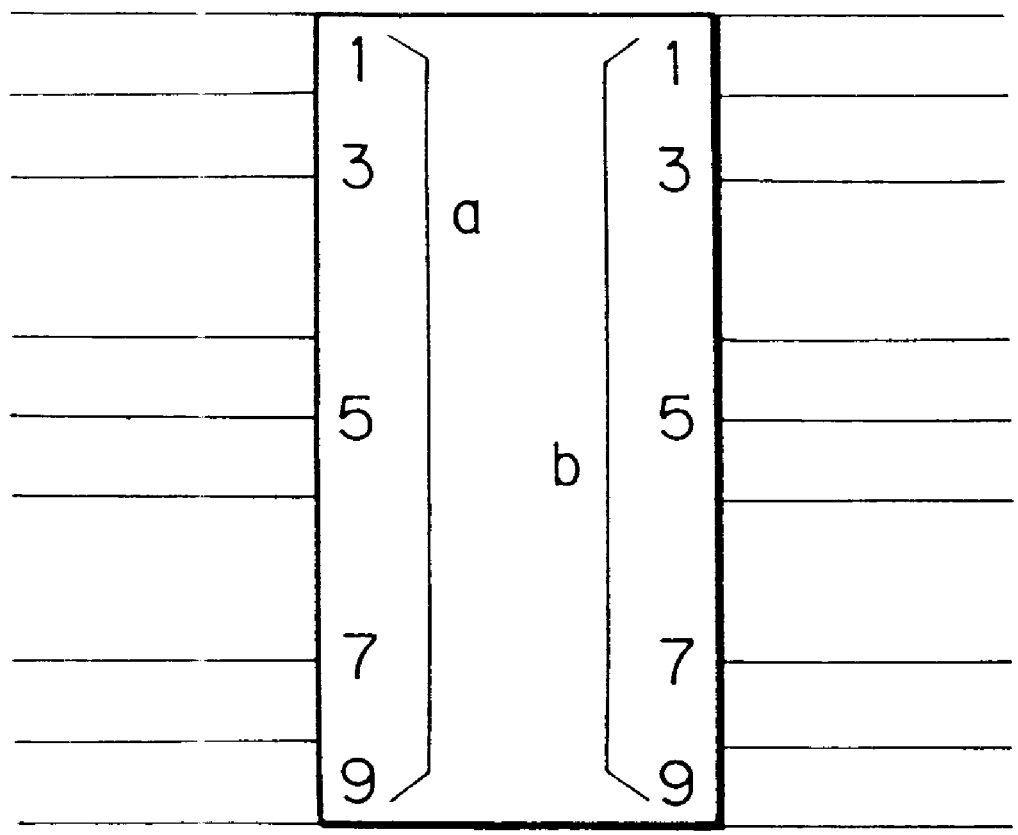
FIG. 18 is a functional block diagram showing a port arrangement of the wavelength router in accordance with the fifth embodiment as shown in FIG. 17.

FIG. 18 is a schematic diagram of the wavelength router 94, and FIG. 19 illustrates the demultiplexing and multiplexing characteristics of a matrix 97 in terms of the wavelengths on the input ports a1–a9 and output ports b1–b9 as shown in FIG. 18.

The wavelength router 94 receives a 9-multiwavelength optical signal including wavelengths $\lambda 2$–$\lambda 0$ ($\lambda 0$, $\lambda 2$, $\lambda 3$, $\lambda 5$, $\lambda 6$ and $\lambda 8$) incoming to the input ports a3, a6 and a9, demultiplexes it to 3-multiwavelength optical signals in accordance with the matrix 97, and outputs the multiwavelength signals including wavelengths ($\lambda 3$, $\lambda 6$, $\lambda 0$), and ($\lambda 2$, $\lambda 5$, $\lambda 8$) from the output ports b2, b5 and b8, and b1, b4 and b7, respectively. If multiwavelength signals including wavelengths ($\lambda 3$, $\lambda 6$, $\lambda 0$), and ($\lambda 2$, $\lambda 5$, $\lambda 8$) are supplied to the input ports a2, a5 and a8, and a1, a4 and a7, it multiplexes them to be output from the output ports b3, b6 and b9 as multiwavelength signals including wavelengths $\lambda 2$–$\lambda 0$ ($\lambda 0$, $\lambda 2$, $\lambda 3$, $\lambda 5$, $\lambda 6$ and $\lambda 8$).

The output ports b2, b5 and b8 are connected through the link 97 to the input ports 95a of the 3×3 optical matrix switch 95, the output ports b1, b4 and b7 are connected through the link 98 to the input ports 96a of the 3×3 optical matrix switch 96, the output ports 95b of the switch 95 are connected through the link 99 to the input ports a2, a5 and a8 of the wavelength router 94, and the output ports 96b of the switch 96 are connected through the link 100 to the input ports a1, a4 and a7 of the wavelength router 94. Thus, the multiwavelength optical switch 91 can be formed which carries out circuit switching of the channels on the transmission lines 92 and 93.

The multiwavelength optical switches 80 and 91 combines into one router the two wavelength routers for demultiplexing and multiplexing at the input and output stages represented by the switch 30 as shown in FIG. 7. Since the switches 80 and 91 include only a parallel connection rather than the tri-dimensional cross connection, they can be configured with the foregoing circuit elements, which is one of the features of these switches. This makes it possible to form a multiwavelength optical switch by combining the wavelength routers (referred to as an F type) and, the circuit switches consisting of the matrix (referred to as an S type), and by cascading them in an FSF or SFS fashion.

EMBODIMENT 6

Further embodiments of the multiwavelength optical switches in accordance with the present invention will be described.

Figure 20:
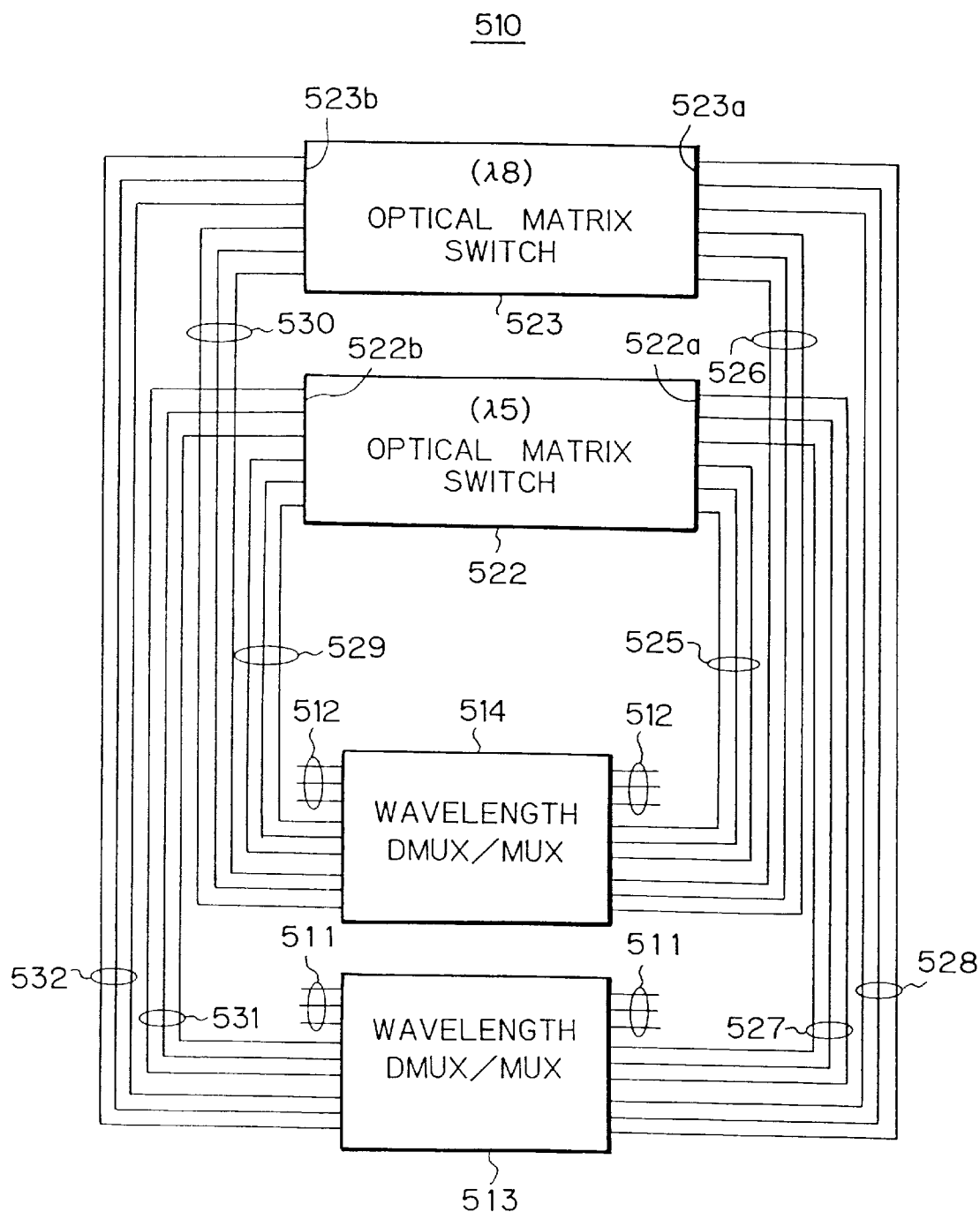
FIG. 20 is a functional block diagram showing a sixth embodiment of a multiwavelength optical switch in accordance with the present invention.
Figure 21:
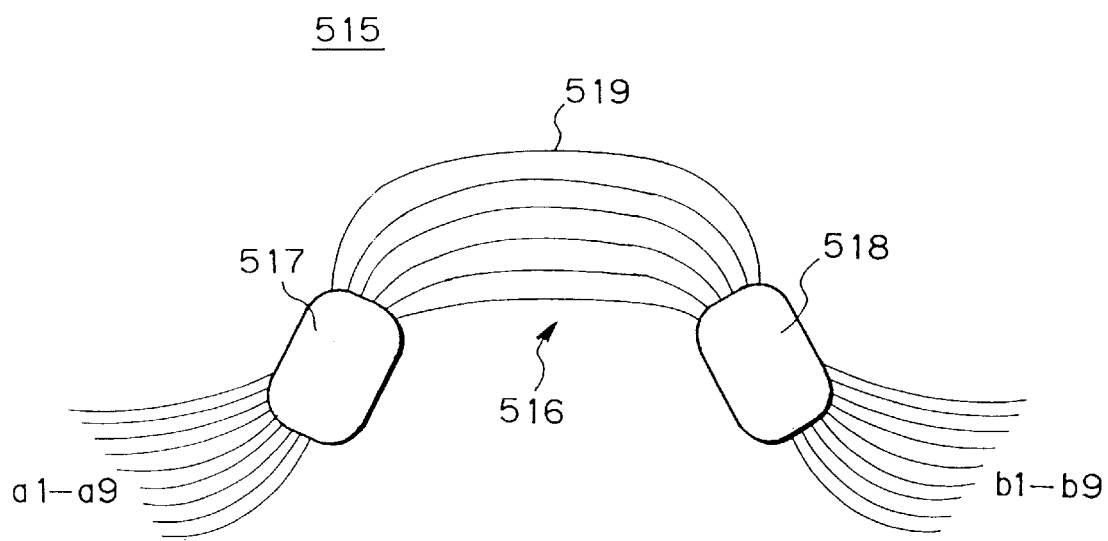
FIG. 21 is a schematic diagram illustrating a structure of a wavelength router used as a multi-input wavelength demultiplexer and multiplexer shown in FIG. 20.

FIG. 20 is a block diagram showing the configuration of a multiwavelength optical switch of this embodiment. The multiwavelength optical switch 510 is connected to M optical transmission lines and performs circuit switching between channels. Here, each of the M optical transmission lines transmits an optical signal whose number of multiplexed wavelengths ($\lambda 5$ and $\lambda 8$) is N, where M and N are natural numbers, and are set at M=6 and N=2 in this embodiment. The six lines are grouped into respective three lines 511 and 512 which are accommodated in multi-input wavelength demultiplexer/multiplexers 513 and 514 which use a wavelength router 515 with a structure as schematically shown in FIG. 21.

The wavelength router 515 comprises optical circuits formed on an optical distributing substrate 516, wherein two planar waveguides 517 and 518 of the same structure are connected to ports a1–a9 and b1–b9 for inputting and outputting optical signals, respectively, and are interconnected through an optical waveguide array 519 including waveguides of different length. The wavelength router 515 exhibits wavelength selecting characteristics as shown in the form of a matrix 521 in FIG. 22 with respect to the optical signals on the ports a1–a9 and b1–b9 of the wavelength router 515. The wavelength router, 515 receives optical signals of a single wavelength or multiwavelengths consisting of any of wavelengths $\lambda 0$ and $\lambda 1$–$\lambda 8$ from ports on a first side, carries out routing of the optical signals in accordance with the wavelength selecting characteristics, and outputs individual wavelengths from corresponding output ports on a second side.

Figure 23:
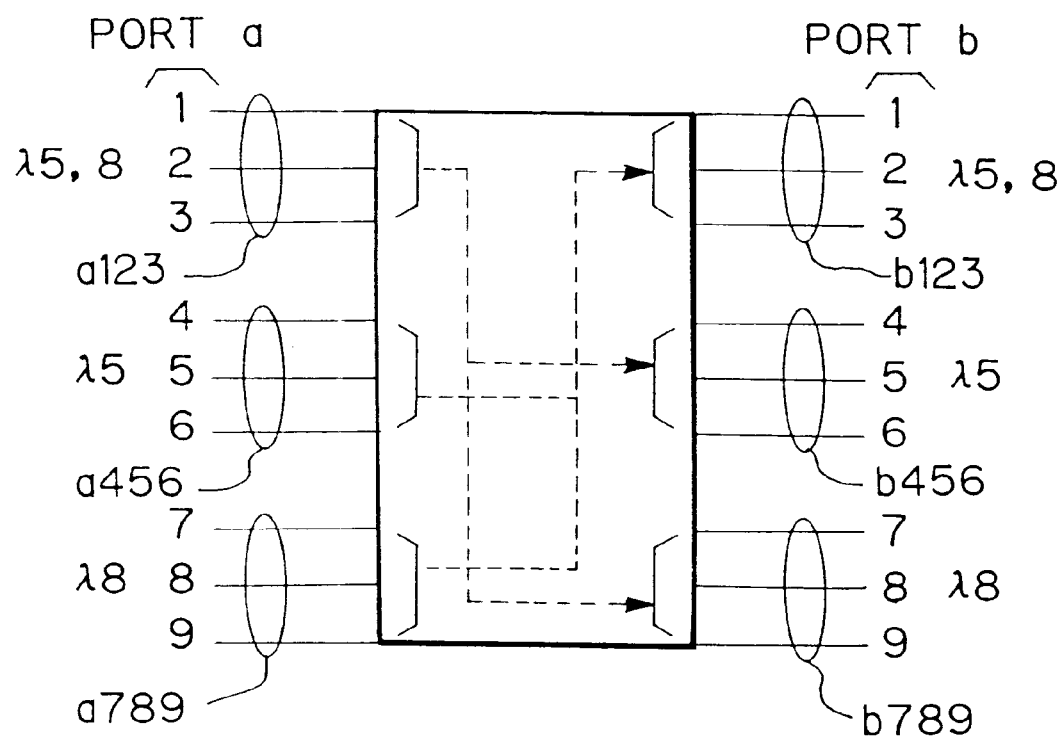
FIG. 23 is a diagram illustrating a configuration of the ports of a multi-input wavelength demultiplexers and multiplexers using the wavelength router as shown in FIG. 22.

The multiwavelength demultiplexer/multiplexers 513 and 514 as shown in FIG. 23 are ones which handle, by using wavelength router 515, only optical signals of wavelengths λ5 and λ8 in the matrix 521. They are a multifunctional circuit, in which the ports a1–a9 and b1–b9 are divided into port sets each consisting of M1 ports, and demultiplexes and multiplexes the multiwavelength signals on the ports. Here, M1 is a natural number, which is set at M1=3 in this embodiment. More specifically, the multiwavelength demultiplexer/multiplexers 513 and 514 demultiplex multi-wavelength signals input to ports a1–a3, and output signals of wavelength λ5 from ports b4–b6 and signals of wavelength λ8 from ports b7–b9. In addition, the signals with wavelengths of λ5 or λ8 input to ports a4–a6 and a7–a9 are multiplexed to multiwavelength signals with wavelengths of λ5 and λ8 to be output from the ports b1–b3. Assuming that the number of ports of the wavelength router 515 is n×n where n is a natural number, the number of ports constituting each port set is M1, the number of wavelengths of the multiplexed signals is N and the number of wavelengths of the demultiplexed signals is P, the value P is 1≦P<N, and the relationship n=M1(M+1) holds when M1>N.

Returning to FIG. 20, in the multiwavelength optical switch 510, the multiwavelength demultiplexer/multiplexers 513 and 514 of this embodiment have the numbers N=2, M=3 and P=1. Optical matrix switches 522 and 523 are a switch for carrying out circuit switching between channels, and each of the switches has 6×6 input and output ports to which optical signals of wavelengths λ5 and λ8 are connected. The input ports 522a and 523a of the two switches are connected through links 525–528 to the ports b4–b6 and b7–b9 of the multiwavelength demultiplexer/multiplexer 513 and 514 shown in FIG. 23, and the output ports 522b and 523b of the two switches are connected through links 529–532 to the ports a4–a6 and a7–a9 of the multiwavelength demultiplexer/multiplexers 513 and 514, thereby forming the multiwavelength optical switch 510. In FIG. 23, reference codes "a123" etc. represent ports a1, a2 and a3, etc.

The multiwavelength demultiplexer/multiplexer 513 demultiplexes the multiplexed signals, each of which includes wavelengths λ5 and λ8, and is input to one of the ports a1–a3 through the optical transmission lines 511, and then outputs signals whose wavelength is λ5 or λ8 from the ports b4–b6 and b7–b9, respectively. The demultiplexed signals are input to the matrix switches 522 and 523 which carry out the circuit switching of the signals. Subsequently, the optical signals whose wavelength is λ5 or λ8 output from the matrix switches 522 and 523 are input to the ports a4–a6 and a7–a9 of the multiwavelength demultiplexer/multiplexer 513 which carries multiplexing of the input signals, and outputs from the ports b1–b3 the multiplexed signals including the wavelengths λ5 and λ8. With regard to the optical transmission lines 512, the multiwavelength demultiplexer/multiplexer 514, together with the matrix switches 522 and 523, carries out circuit switching of the multiplexed signals λ5 and λ8 in the same manner as described above.

EMBODIMENT 7

Figure 24:
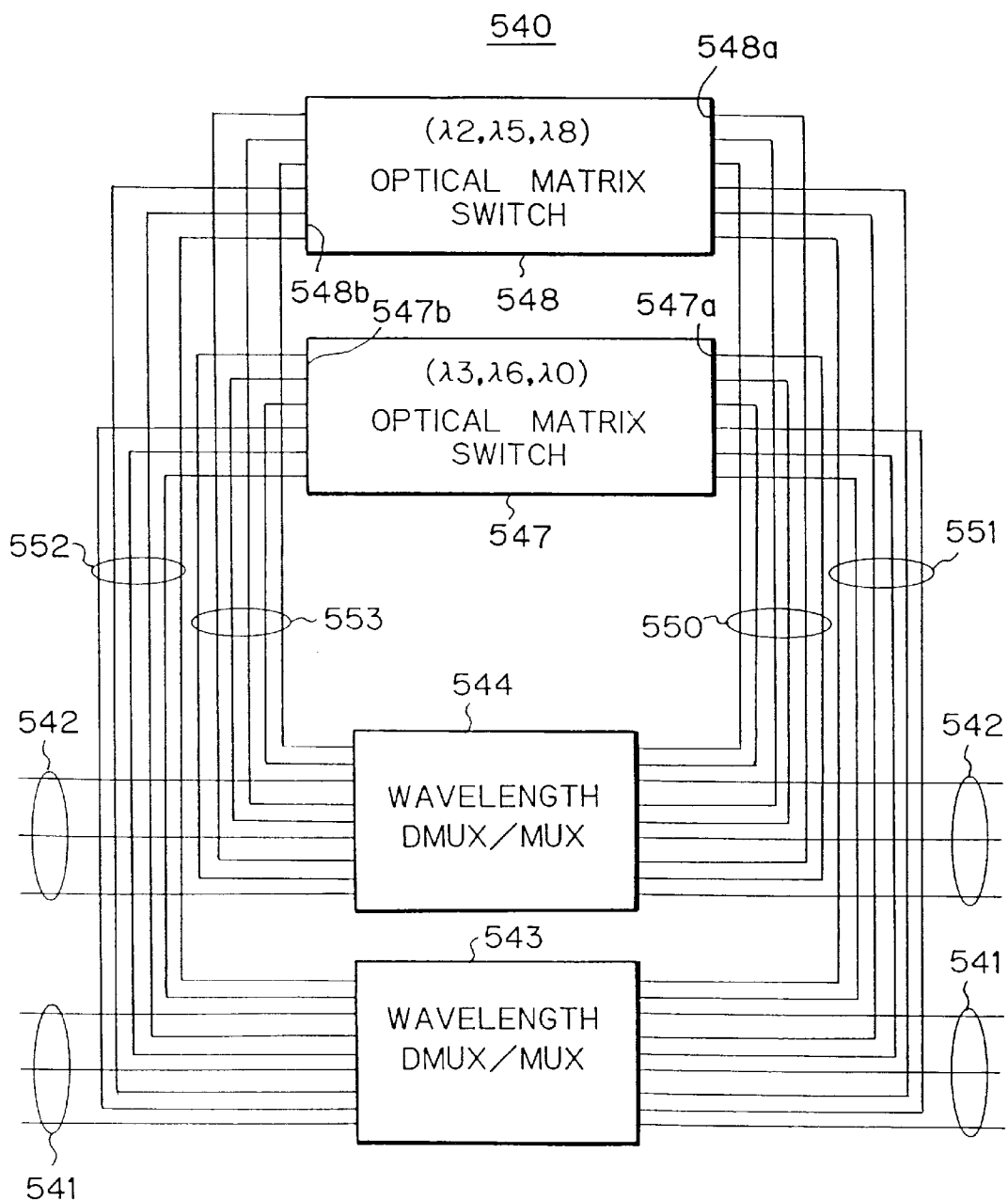
FIG. 24 is a functional block diagram showing a configuration of a multiwavelength optical switch in accordance with a seventh embodiment of the present invention.

FIG. 24 is a block diagram showing the configuration of a multiwavelength optical switch of a seventh embodiment in accordance with the present invention. A multiwavelength optical switch 540 for performing circuit switching between channels is connected to M (M=6) optical transmission lines, each for transmitting an optical signal with a number of multiplexed wavelengths λ0, λ2, λ3, λ5, λ6 and λ8 being N (N=6). In FIG. 26, notations "λ023568" represent wavelengths λ0, λ2, λ3, λ5, λ6, λ8. The six lines are grouped into respective M1 (M1=3) lines 541 and 542 accommodated in multi-input wavelength demultiplexers/multiplexers 543 and 544.

The multiwavelength demultiplexer/multiplexers 543 and 544 shown in FIG. 24 each comprise ports a1–a9, and have wavelength selecting characteristics as shown in FIG. 25 in the form of a matrix 545. They are a multifunctional circuit, in which the ports a1–a9 and b1–b9 are grouped into three port sets, respectively, and carry out demultiplexing and multiplexing of the signals on the respective three lines. Specifically, the multiwavelength demultiplexer/multiplexers 543 and 544 demultiplex the multiplexed signals λ0, λ2, λ3, λ5, λ6, λ8 input to the ports a3, a6, a9 to output signals λ0, λ3, λ6 from the ports b2, b5, b8, and output signals λ2, λ5, λ8 from the ports b1, b4, b7. The signals λ2, λ5, λ8 and λ0, λ3, λ6 are input to the ports a1, a4, a7 and a2, a5, a8 to be multiplexed into multiplexed signals λ0, λ2, λ3, λ5, λ6, λ8 output from the ports b3, b6, b9. Assuming that the multiwavelength demultiplexer/multiplexers 543 and 544 divide the n×n (n=9) ports to port sets, each consisting of M1 (M1=3) ports, the number of wavelengths of the multiplexed signal is N (N=6), and the number of wavelengths of the demultiplexed signals is P (P=3 and 1≦P<N), the relationship n=M1(N+1) holds when M1<N.

In FIG. 24, optical matrix switches 547 and 548 are a switch for carrying out circuit switching between channels, each of the switches having 6×6 input and output ports 547a, 548a, 547b and 548b to which optical signals of wavelengths λ0, λ3, λ6 and λ2, λ5, λ8 are connected.

The multiwavelength demultiplexer/multiplexers 543 and 544 connect their ports a3, a6, a9 and b3, b6, b9 as shown in FIG. 26 to optical transmission lines 541 and 542, ports b2, b5, b8 and b1, b4, b7 to the input ports 547a and 548a of the optical matrix switches 547 and 548 through links 550 and 551, and connect their ports a2, a5, a8 and a1, a4, a7 to the output ports 547b and 548b of the optical matrix switch through links 552 and 553. With this arrangement, the multiwavelength optical switch 540 is connected to 6 optical transmission lines of wavelengths λ0, λ2, λ3, λ5, λ6 and λ8, which makes it possible to perform circuit switching.

Thus, the multiwavelength optical switches 510 and 540 which are connected M transmission lines as shown in FIGS. 20 and 24 can reduce the number of composition elements of the input and output stages to equal to or less than M/2M1 as compared with the number 2M of the conventional system. This is achieved by dividing the input and output ports to form the port sets, each consisting of M1 (M1=3) ports in the multiwavelength demultiplexer/multiplexers. In addition, the number of links crossing in the switches is reduced in comparison with the conventional system, and the number of distributing lines can also be reduced by employing cross waveguides formed on the same plane on the optical distributing substrate, or by employing ribbon optical fibers.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A wavelength router comprising:

M first ports each receiving or providing a first multiwavelength optical signal having a plurality of wavelengths, M being a first natural number;

n second ports each providing or receiving a plurality of second multiwavelength optical signals having a plurality of multiplexed wavelengths, n being a second natural number greater than said first natural number M, the number of multiplexed wavelengths of said second multiwavelength optical signals being smaller than the number of wavelengths of said first multiwavelength optical signal;

demultiplexing means coupled to said M first ports and said n second ports for demultiplexing the first multiwavelength optical signal received by said M first ports into the plurality of second multiwavelength optical signals, and for supplying the plurality of second multiwavelength optical signals to said n second ports; and multiplexing means coupled to said M first ports and said n second ports for multiplexing the plurality of second multiwavelength optical signals received by said n second ports into the first multiwavelength optical signal, and for supplying the first multiwavelength optical signal to said M first ports;

wherein said first multiwavelength optical signal has a number N of multiplexed wavelengths, said plurality of second ports are divided into M sets of second ports and said demultiplexing means demultiplexes said first multiwavelength optical signal to optical signals whose number of multiplexed wavelengths is N/M, and supplies said optical signals to said M sets of second ports.

2. A wavelength router comprising:

n first ports and n second ports, where n is a first natural number;

M first ports of said n first ports each receiving a first multiwavelength optical signal having a plurality of wavelengths, where M is a second natural number smaller than said first natural number n;

n-M second ports of said n second ports each providing a plurality of second multiwavelength optical signals having a plurality of multiplexed wavelengths, the number of multiplexed wavelengths of said second multiwavelength optical signals being smaller than the number of wavelengths of said first multiwavelength optical signal;

demultiplexing means coupled to said M first ports and said n-M second ports for demultiplexing the first multiwavelength optical signal received by said M first ports into the plurality of second multiwavelength optical signals, and for supplying the plurality of second multiwavelength optical signals to said n-M second ports;

n-M remaining first ports of said n first ports other than said M first ports each receiving the second multiwavelength optical signals output from said n-M second ports;

M remaining second ports of said n second ports other than said n-M second ports each providing a third multiwavelength optical signal having a plurality of multiplexed wavelengths, the number of multiplexed wavelengths of said third multiwavelength optical signal being greater than the number of multiplexed wavelengths of said second multiwavelength optical signal; and multiplexing means coupled to said n-M remaining first ports and said M remaining second ports for multiplexing the second multiwavelength optical signals received by the n-M remaining first ports into the third multiwavelength optical signal, and for supplying the third multiwavelength optical signal to the M remaining second ports;

wherein said fist and third multiwavelength optical signals have a number N of multiplexed wavelengths, and said demultiplexing means demultiplexes said first multiwavelength optical signal to optical signals with the number of multiplexed wavelengths being N/M.

3. The wavelength router as claimed in claim 2, wherein said third multiwavelength optical signal corresponds to said first multiwavelength optical signal.

* * * * *